(12) United States Patent
Downing et al.

(10) Patent No.: US 9,004,842 B2
(45) Date of Patent: Apr. 14, 2015

(54) HOIST APPARATUS

(71) Applicant: Wastequip, LLC, Charlotte, NC (US)

(72) Inventors: John J. Downing, Winamac, IN (US); Nathan L. Martindale, Star City, IN (US)

(73) Assignee: Wastequip, LLC, Charlotte, NC (US)

( * ) Notice: Subject to any disclaimer, the term of this patent is extended or adjusted under 35 U.S.C. 154(b) by 146 days.

(21) Appl. No.: 13/648,859

(22) Filed: Oct. 10, 2012

(65) Prior Publication Data

US 2013/0089397 A1    Apr. 11, 2013

Related U.S. Application Data

(60) Provisional application No. 61/545,506, filed on Oct. 10, 2011.

(51) Int. Cl.
*B60P 1/28* (2006.01)
*B60P 1/64* (2006.01)

(52) U.S. Cl.
CPC .................... *B60P 1/6454* (2013.01)

(58) Field of Classification Search
CPC .... B06P 1/6454; B06P 1/6463; B06P 1/6427; B06P 1/6418
USPC .......... 414/477, 478, 494, 480, 500; 254/335, 254/336, 338, 393–398
See application file for complete search history.

(56) References Cited

U.S. PATENT DOCUMENTS

| | | | |
|---|---|---|---|
| 3,252,563 A | 5/1966 | Jeungel | |
| 3,841,505 A | 10/1974 | Kent | |
| 4,109,810 A * | 8/1978 | Jones | 414/477 |
| 4,455,118 A * | 6/1984 | Scharf | 414/494 |
| 4,461,608 A | 7/1984 | Boda | |
| 4,529,345 A | 7/1985 | Van Gompel | |
| 4,531,780 A | 7/1985 | Boczkiewicz | |
| 4,558,879 A | 12/1985 | Palfinger | |
| 4,645,405 A * | 2/1987 | Cambiano | 414/494 |
| 4,690,607 A | 9/1987 | Johnson | |

(Continued)

FOREIGN PATENT DOCUMENTS

WO    2007/092613    8/2007

OTHER PUBLICATIONS

International Search Report and Written Opinion from PCT/US07/03550 dated Jul. 24, 2009.

(Continued)

*Primary Examiner* — Kaitlin Joerger
(74) *Attorney, Agent, or Firm* — K&L Gates LLP

(57) ABSTRACT

A hoist apparatus is provided for loading an article onto a vehicle. The hoist apparatus generally includes a frame; a stationary sheave block including at least a first pulley and a second pulley; a moveable sheave carrier adapted for movement along the length of the frame, the moveable sheave carrier including at least a third pulley and a fourth pulley. At least one powered winch mechanism is attached to the moveable sheave carrier for moving the moveable sheave carrier along the length of the frame. A cable is provided which includes a first end detachably fixed to an article to be loaded onto a vehicle and a second end fixed to the hoist apparatus, the cable being adapted for travelling through the first pulley and the second pulley of the stationary sheave block and the third pulley and fourth pulley of the moveable sheave carrier in a predetermined path.

17 Claims, 29 Drawing Sheets

(56) References Cited

U.S. PATENT DOCUMENTS

| | | | |
|---|---|---|---|
| 4,708,570 A | 11/1987 | Smith et al. | |
| 4,836,394 A | 6/1989 | Glomski | |
| 4,931,772 A | 6/1990 | Bechtold | |
| 4,934,989 A | 6/1990 | Furukawa et al. | |
| 4,954,020 A | 9/1990 | Smith et al. | |
| 4,954,040 A | 9/1990 | Smith et al. | |
| 5,015,144 A | 5/1991 | Smith et al. | |
| 5,020,844 A | 6/1991 | Pickrell | |
| 5,022,185 A * | 6/1991 | Oatman | 49/425 |
| 5,026,104 A | 6/1991 | Pickrell | |
| 5,074,622 A | 12/1991 | Channell | |
| 5,122,025 A | 6/1992 | Glomski | |
| 5,203,668 A | 4/1993 | Marmur | |
| 5,209,537 A | 5/1993 | Smith et al. | |
| 5,217,135 A | 6/1993 | Smith et al. | |
| 5,246,330 A | 9/1993 | Marmur et al. | |
| RE34,733 E | 9/1994 | Channell | |
| 5,398,969 A | 3/1995 | Wimmer | |
| 5,413,402 A | 5/1995 | Flerchinger et al. | |
| 5,419,671 A | 5/1995 | Smith et al. | |
| 5,421,613 A | 6/1995 | Allison et al. | |
| 5,427,496 A | 6/1995 | Ratledge, Jr. et al. | |
| 5,478,188 A | 12/1995 | Rea et al. | |
| 5,482,180 A | 1/1996 | Smith et al. | |
| 5,484,245 A | 1/1996 | Zopf | |
| 5,501,346 A | 3/1996 | Wimmer | |
| 5,513,901 A | 5/1996 | Smith et al. | |
| 5,513,942 A | 5/1996 | Pickrell | |
| 5,518,129 A | 5/1996 | Sieberer | |
| 5,520,443 A | 5/1996 | Zanzig | |
| 5,527,098 A | 6/1996 | McKinney et al. | |
| 5,547,332 A | 8/1996 | Smith et al. | |
| 5,551,824 A | 9/1996 | Zanzig et al. | |
| 5,577,877 A | 11/1996 | Smith et al. | |
| 5,607,277 A | 3/1997 | Zopf | |
| 5,642,711 A | 7/1997 | Boner et al. | |
| 5,658,117 A | 8/1997 | McKinney et al. | |
| 5,673,960 A | 10/1997 | Sorensen | |
| D386,128 S | 11/1997 | Gerding et al. | |
| 5,687,938 A | 11/1997 | Bailey | |
| D393,234 S | 4/1998 | Stragier | |
| 5,755,547 A | 5/1998 | Flerchinger et al. | |
| 5,759,008 A | 6/1998 | Smith et al. | |
| 5,765,985 A | 6/1998 | Johnson et al. | |
| 5,813,824 A | 9/1998 | Zanzig et al. | |
| 5,823,733 A | 10/1998 | Kruzick | |
| 5,836,657 A | 11/1998 | Tilley et al. | |
| 5,846,044 A | 12/1998 | Smith et al. | |
| 5,871,330 A | 2/1999 | Davenport | |
| D409,524 S | 5/1999 | McKinney | |
| 5,921,742 A * | 7/1999 | Gearhart | 414/480 |
| D412,682 S | 8/1999 | Gerding et al. | |
| D414,138 S | 9/1999 | McKinney | |
| 6,004,092 A | 12/1999 | Johnson et al. | |
| 6,012,892 A | 1/2000 | Stragier | |
| 6,012,895 A | 1/2000 | Smith et al. | |
| D425,845 S | 5/2000 | Gerding et al. | |
| 6,079,461 A | 6/2000 | Fisher et al. | |
| 6,089,354 A | 7/2000 | Hettegger | |
| 6,095,365 A | 8/2000 | Yielding | |
| D433,979 S | 11/2000 | Gerding et al. | |
| 6,174,126 B1 | 1/2001 | Zanzig et al. | |
| 6,183,185 B1 | 2/2001 | Zanzig et al. | |
| 6,193,295 B1 | 2/2001 | Stragier | |
| 6,250,423 B1 | 6/2001 | Bartsch | |
| 6,250,873 B1 | 6/2001 | Stragier | |
| 6,328,173 B1 | 12/2001 | Wimmer | |
| 6,354,787 B1 * | 3/2002 | O'Daniel | 414/494 |
| 6,406,247 B1 | 6/2002 | Ghiretti et al. | |
| 6,409,275 B1 | 6/2002 | Gerding | |
| 6,457,630 B1 | 10/2002 | Nilsson | |
| 6,471,233 B1 | 10/2002 | Stragier | |
| 6,485,244 B1 | 11/2002 | McKinney | |
| 6,491,489 B1 | 12/2002 | Stragier | |
| 6,520,008 B1 | 2/2003 | Stragier | |
| 6,565,108 B1 | 5/2003 | Gearhart | |
| 6,576,285 B1 | 6/2003 | Bader et al. | |
| 6,595,569 B1 | 7/2003 | McKinney | |
| 6,726,409 B1 | 4/2004 | Yielding et al. | |
| 6,733,027 B2 | 5/2004 | Stragier et al. | |
| 6,761,523 B2 | 7/2004 | Hund, Jr. et al. | |
| 6,814,378 B1 | 11/2004 | Marmur | |
| 6,827,542 B1 | 12/2004 | Stragier | |
| 6,877,794 B2 | 4/2005 | Bush, Sr. | |
| 6,890,020 B2 | 5/2005 | Bush, Sr. | |
| 6,948,887 B1 | 9/2005 | Yielding et al. | |
| 6,955,520 B2 | 10/2005 | Flerchinger et al. | |
| 7,037,061 B2 | 5/2006 | Hund, Jr. et al. | |
| 7,066,705 B1 | 6/2006 | Keller et al. | |
| 7,192,239 B2 * | 3/2007 | Marmur et al. | 414/478 |
| 7,192,293 B2 | 3/2007 | Wasalaski | |
| 7,204,379 B2 | 4/2007 | Wimmer | |
| 7,278,811 B1 | 10/2007 | Yielding et al. | |
| 7,278,816 B2 | 10/2007 | Marmur et al. | |
| 7,568,881 B1 | 8/2009 | Collins | |
| 7,572,091 B1 | 8/2009 | Collins | |
| 7,654,767 B2 | 2/2010 | Sieberer | |
| 7,695,237 B2 * | 4/2010 | Shirvanian | 414/494 |
| 7,740,429 B2 | 6/2010 | Marmur | |
| 7,878,349 B2 | 2/2011 | Wimmer | |
| 8,029,228 B2 * | 10/2011 | Marmur | 414/478 |
| 8,043,043 B2 | 10/2011 | Collins | |
| 8,113,363 B2 | 2/2012 | Wimmer | |
| 8,191,922 B2 * | 6/2012 | Gabourie | 280/656 |
| 8,444,365 B2 * | 5/2013 | Duell et al. | 414/494 |
| 2004/0091345 A1 | 5/2004 | Flerchinger et al. | |
| 2004/0100064 A1 | 5/2004 | Bush, Sr. | |
| 2005/0035077 A1 | 2/2005 | Wimmer | |
| 2005/0052057 A1 | 3/2005 | Siebel | |
| 2005/0158160 A1 | 7/2005 | Johnson | |
| 2006/0062660 A1 * | 3/2006 | Marmur et al. | 414/498 |
| 2006/0072993 A1 | 4/2006 | Stragier | |
| 2006/0108860 A1 | 5/2006 | Stragier | |
| 2006/0193716 A1 | 8/2006 | Marmur et al. | |
| 2007/0144995 A1 | 6/2007 | Emminger | |
| 2008/0056868 A1 * | 3/2008 | Nitereka et al. | 414/478 |
| 2008/0170925 A1 | 7/2008 | Marmur | |
| 2008/0219821 A1 * | 9/2008 | Marmur | 414/478 |
| 2009/0148262 A1 * | 6/2009 | Shirvanian | 414/471 |
| 2009/0232629 A1 | 9/2009 | Collins | |
| 2009/0324374 A1 * | 12/2009 | De Carli | 414/478 |
| 2010/0047048 A1 | 2/2010 | Zimmermann | |
| 2010/0078403 A1 | 4/2010 | Wimmer | |
| 2010/0303594 A1 | 12/2010 | Duell et al. | |
| 2010/0303595 A1 * | 12/2010 | Duell et al. | 414/491 |
| 2011/0085582 A1 | 4/2011 | Zagar et al. | |
| 2011/0132862 A1 | 6/2011 | Wimmer | |
| 2011/0200416 A1 * | 8/2011 | Doron et al. | 414/482 |
| 2011/0204586 A1 * | 8/2011 | Gabourie | 280/43.11 |
| 2011/0211914 A1 | 9/2011 | Palfinger | |
| 2011/0229292 A1 | 9/2011 | Applewhite | |
| 2012/0027548 A1 | 2/2012 | Whitfield, Jr. et al. | |
| 2012/0186243 A1 | 7/2012 | Verkoyen et al. | |

OTHER PUBLICATIONS

KwikLift, Technology Produces New Performance Levels, brochure, 18 pgs., date unknown.

KwikLift, Raise Productivity to Another Level brochure, 2 pgs., date unkown.

Refuse Parts LLC, DuaLift Home page, 1 page, printed from the worldwide web Feb. 11, 2011.

1 page drawing dated Oct. 9, 1996—Hoists H1, General Specifications NC6-176, Roll-Off Hoist (illustrated hoist assembly components offered for sale at least as early as Oct. 10, 2008) Galbreath, LLC.

2 page drawing dated Apr. 7, 1995—Hoists H1, Complete Assembly NC6-176 (illustrated hoist assembly componentsoffered for sale at least as early as Oct. 10, 2008) Galbreath, LLC.

1 page drawing dated Jul. 22, 1999—Hoists H5, Cable Layout, NC6-176 (4264B0) (illustrated hoist assembly componentsoffered for sale at least as early as Oct. 10, 2008) Galbreath, LLC.

(56) References Cited

OTHER PUBLICATIONS 2 page drawing dated Jul. 16, 2001—Hoists H1, General Specifications, WC-OR-174 (illustrated hoist assembly componentsoffered for sale at least as early as Oct. 10, 2008) Galbreath, LLC.

1 page drawing dated Aug. 16, 2001—Hoists H1, Cable Layout WC Hoists (illustrated hoist assembly components offered for sale at least as early as Oct. 10, 2008) Galbreath, LLC.

1 page drawing dated Jul. 1, 2001—Hoists H1, Sheave FR WHT, WC, WC Style Hoists (illustrated hoist assembly component offered for sale at least as early as Oct. 10, 2008) Galbreath, LLC.

1 page drawing dated Mar. 21, 2003—Hoists H1, Front Sheave Frame Weldment, AM-75-OR-22 (illustrated hoist assembly component offered for sale at least as early as Oct. 10, 2008) Galbreath, LLC.

\* cited by examiner

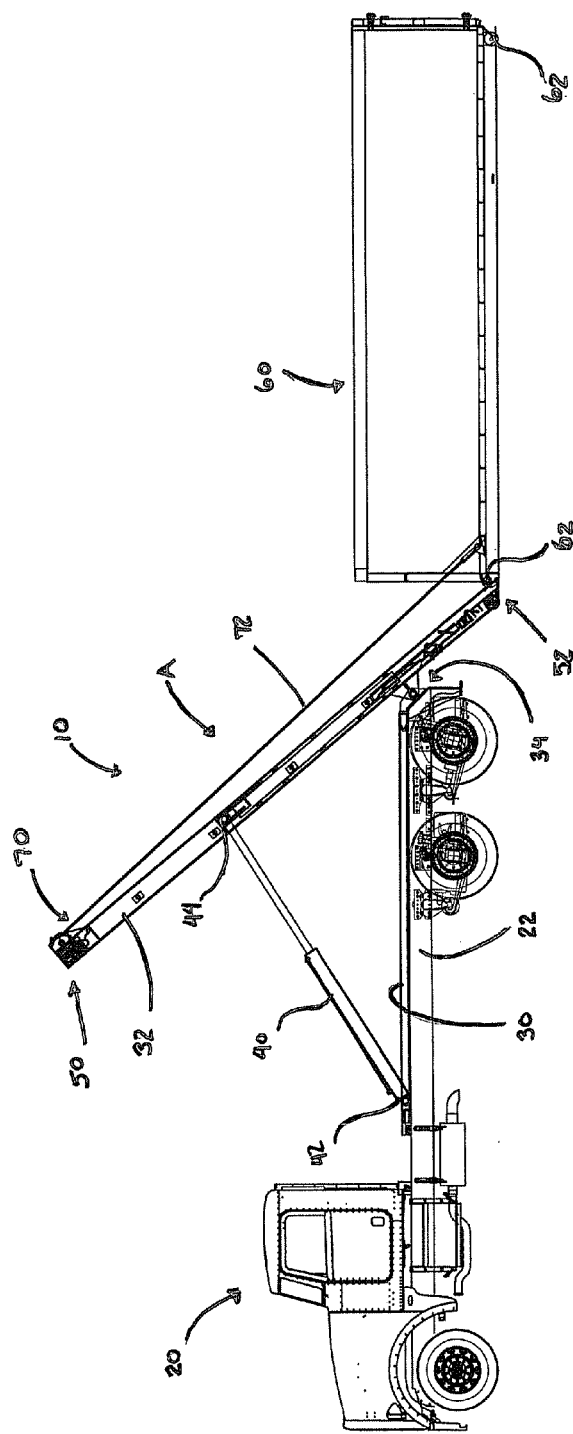

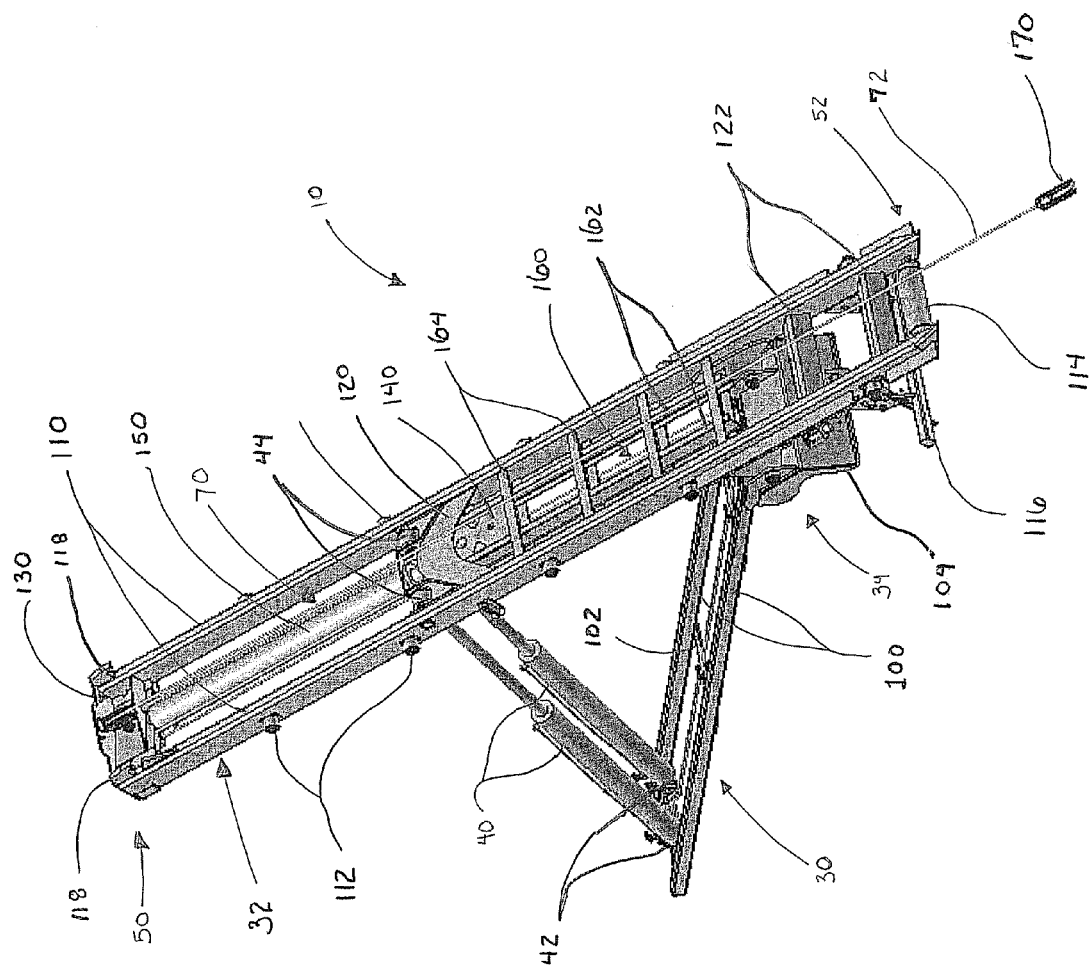

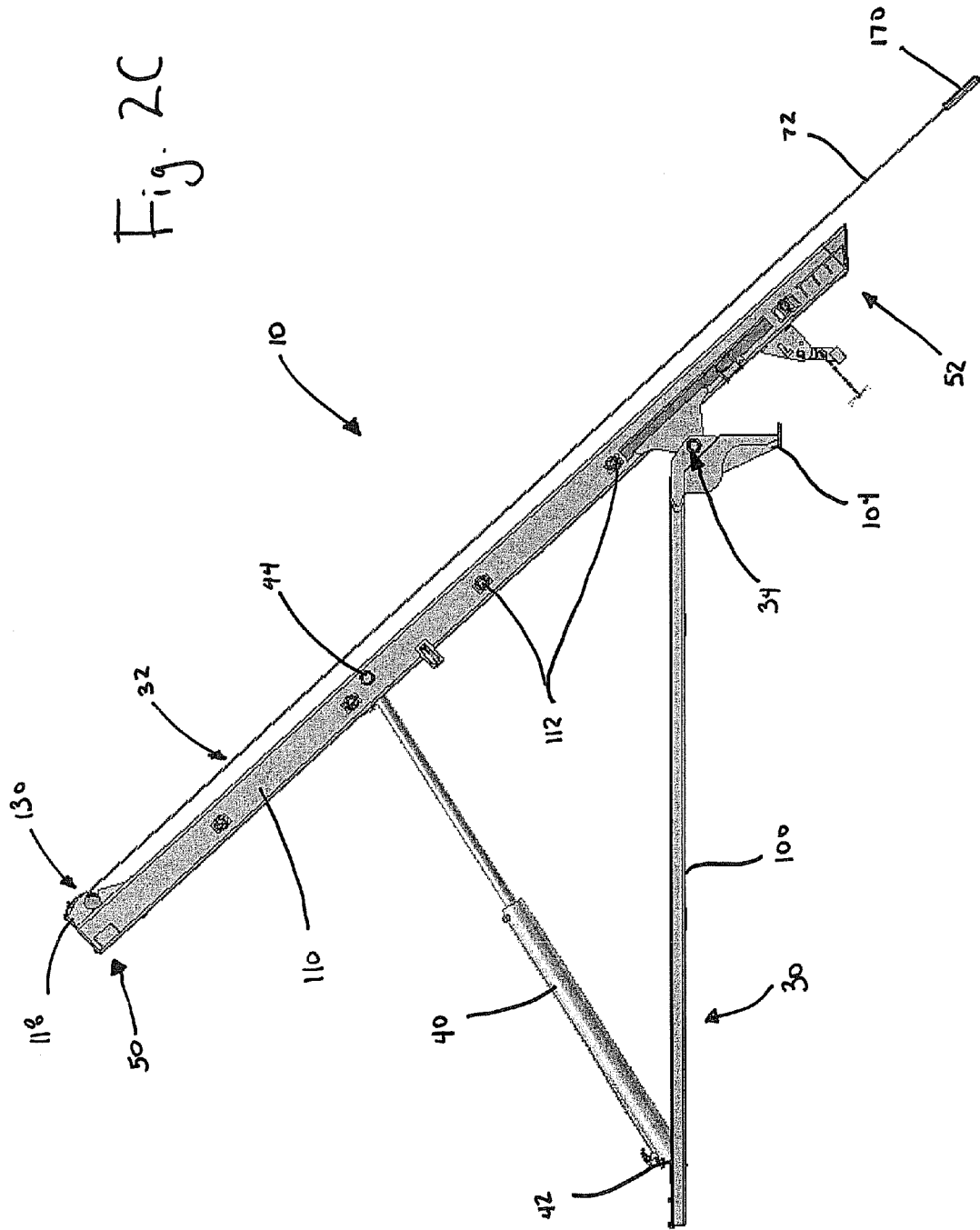

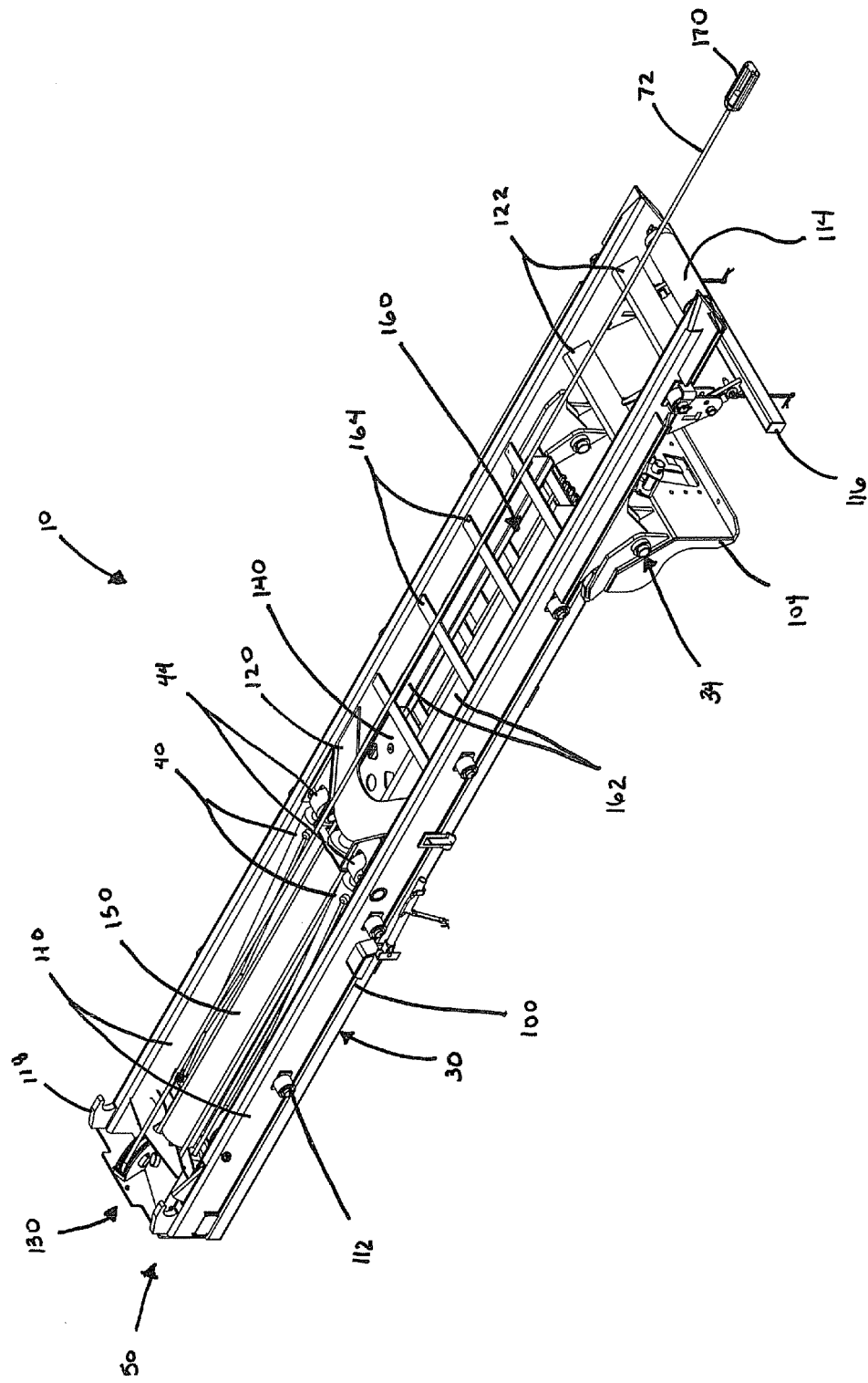

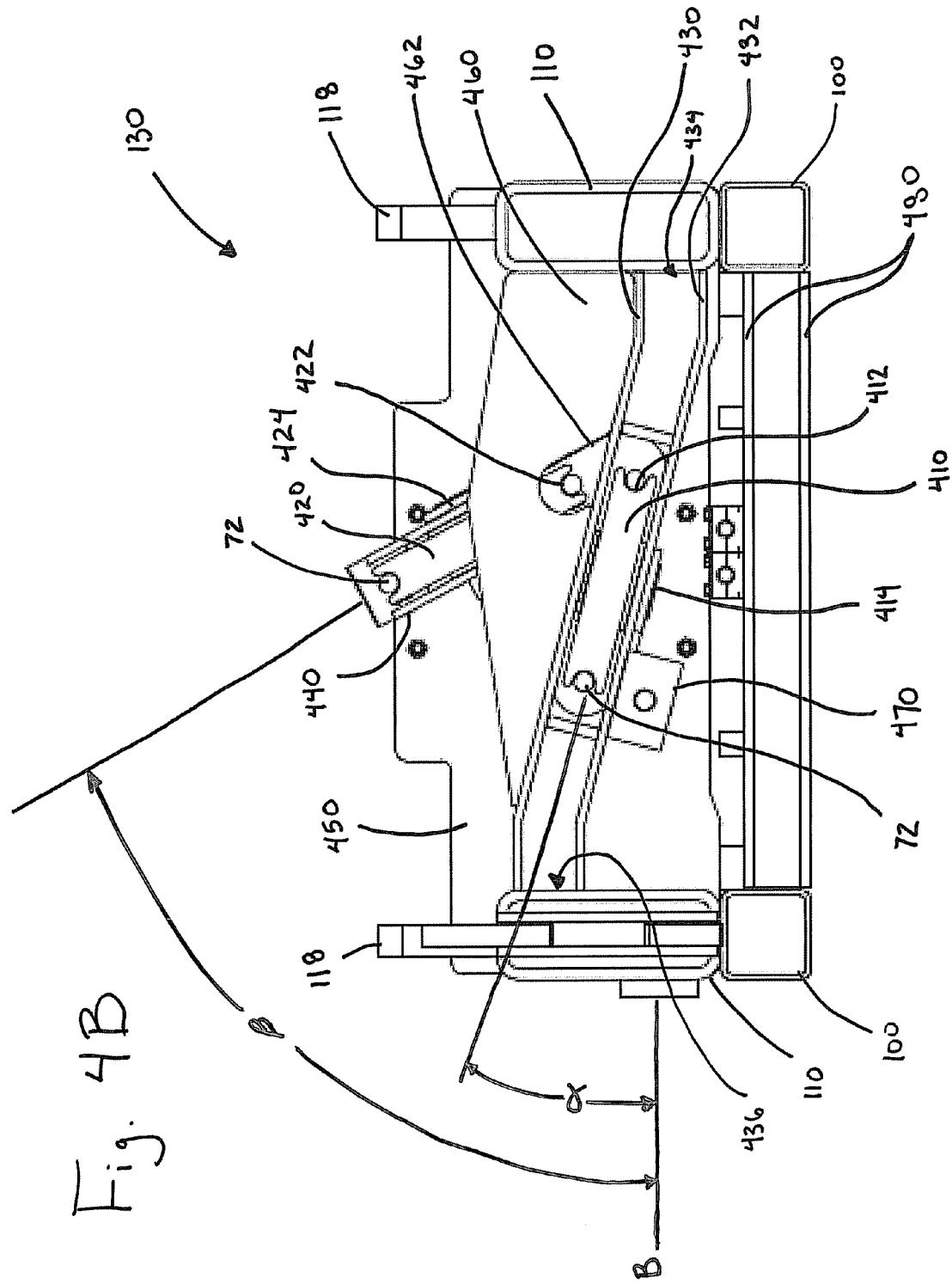

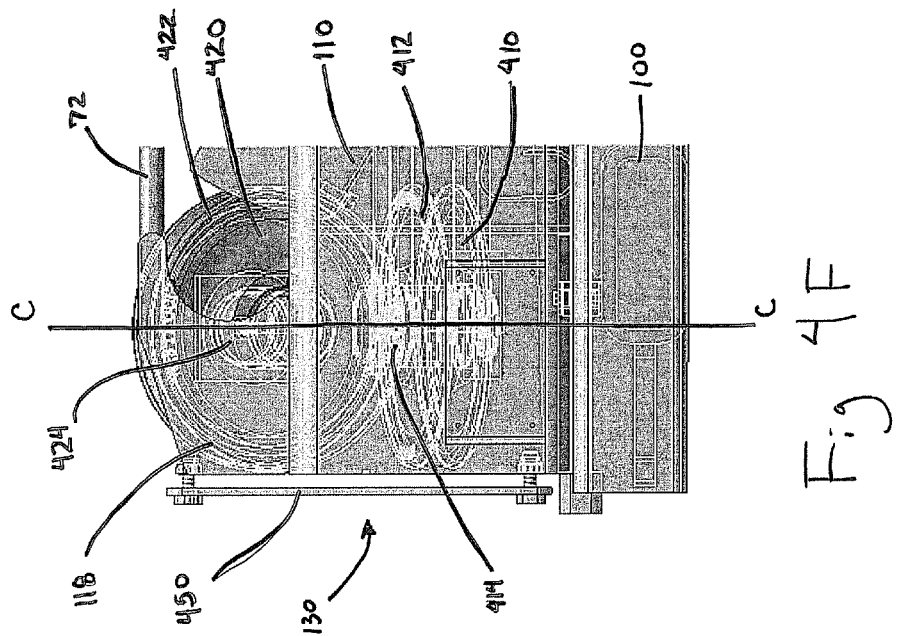
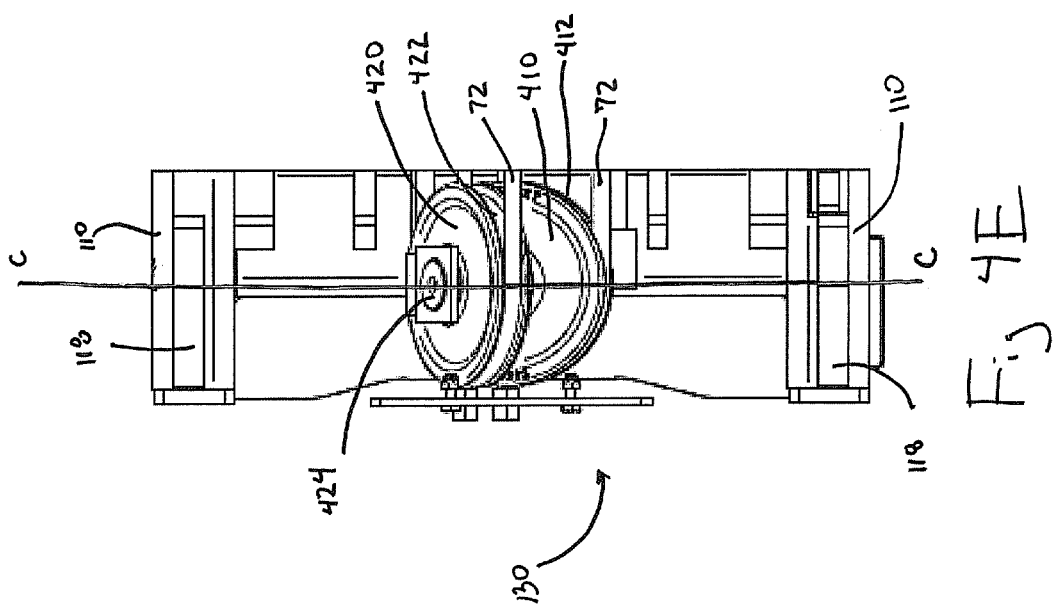

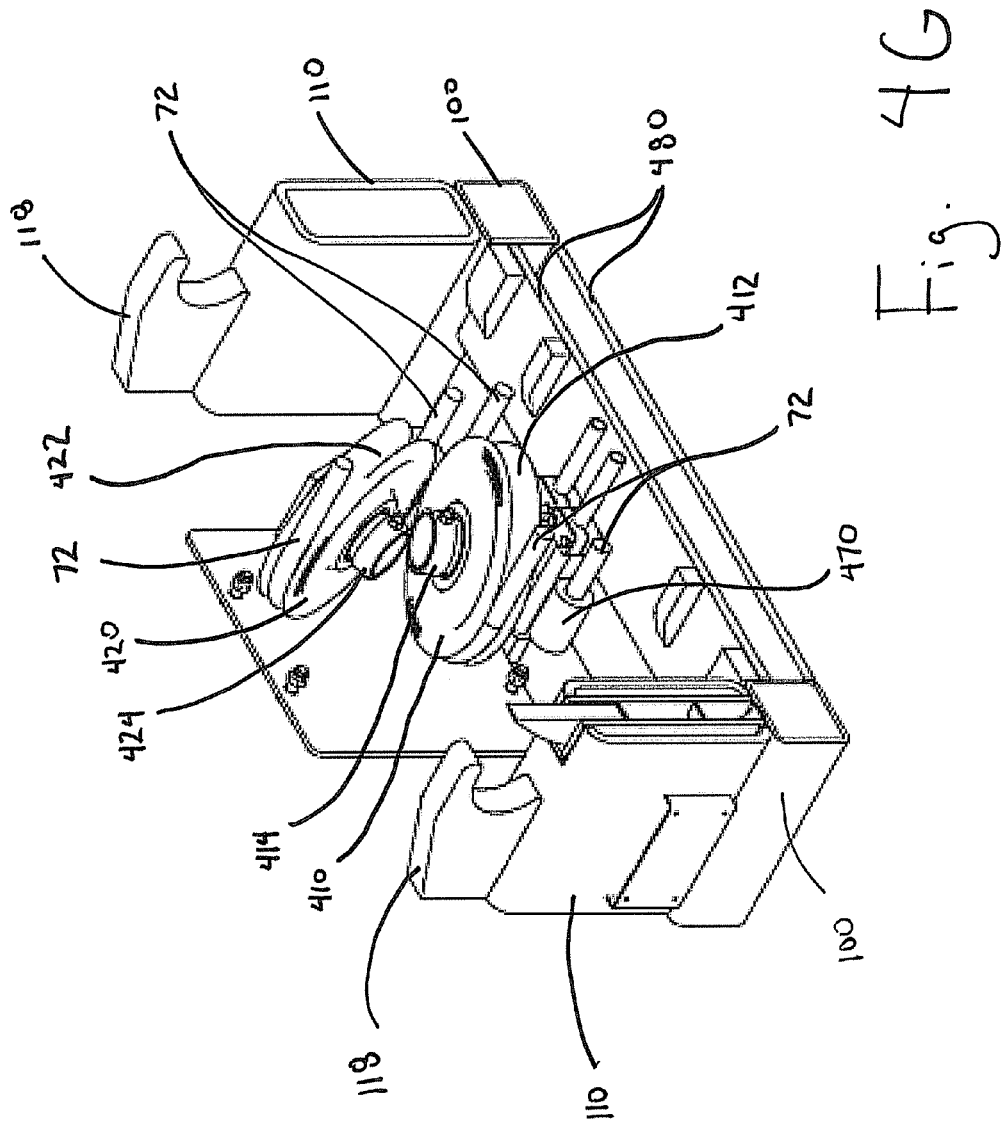

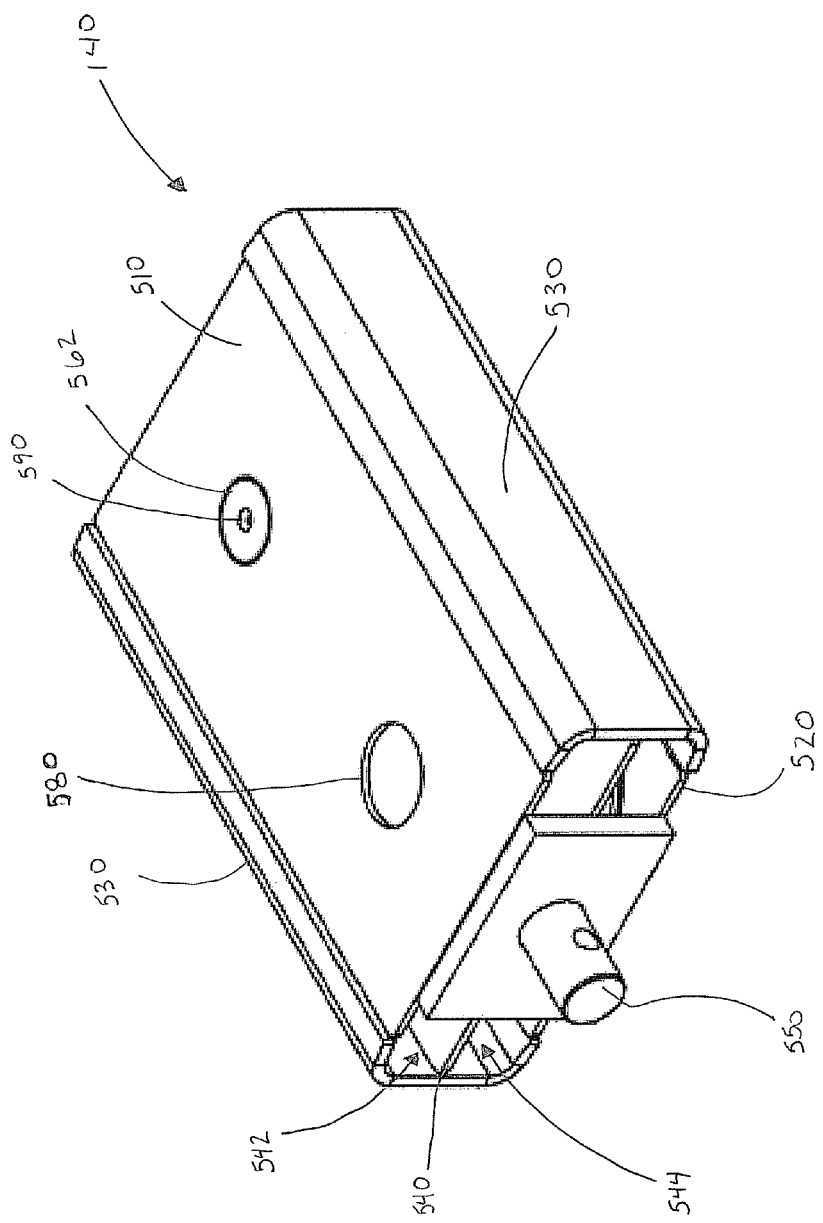

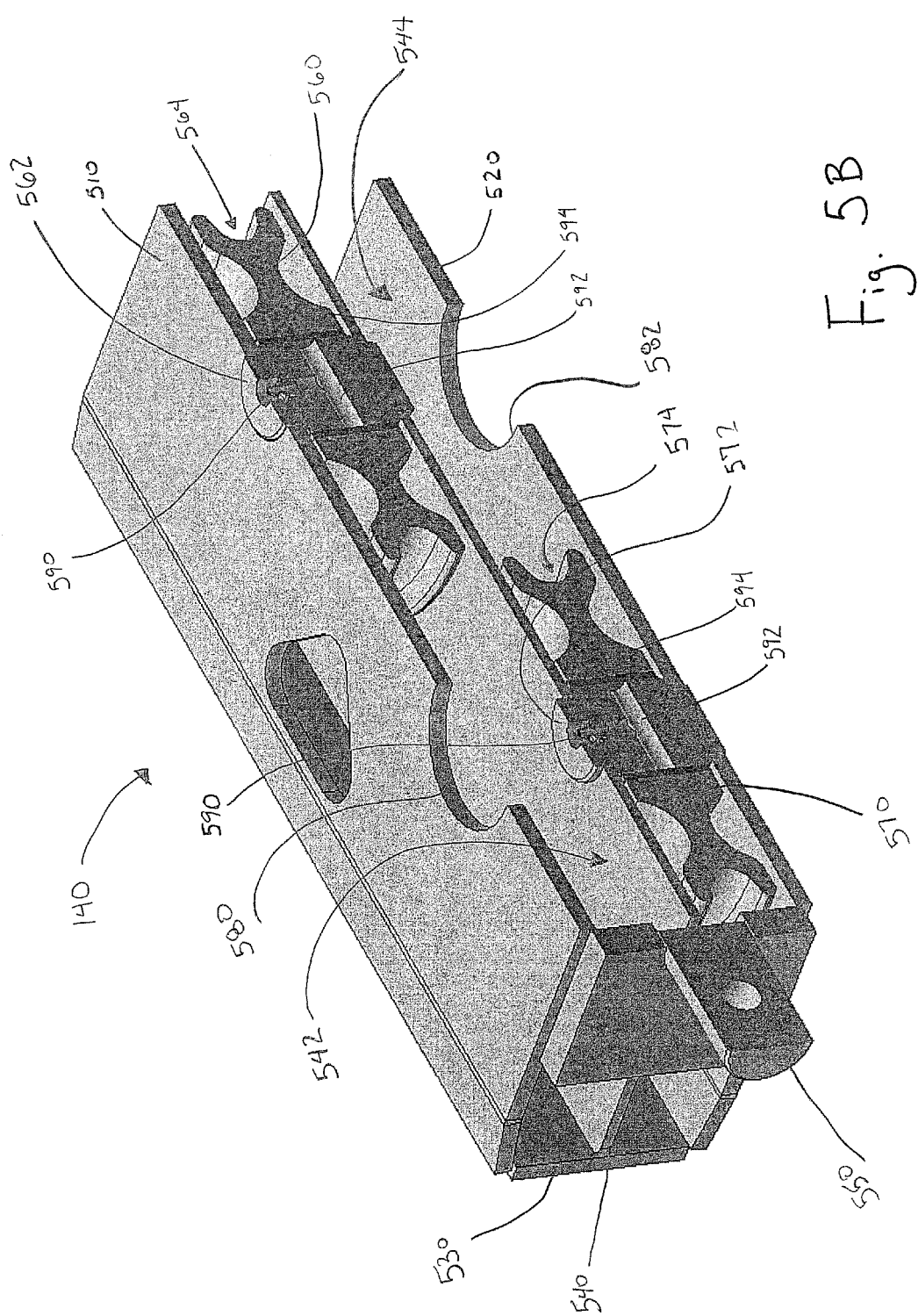

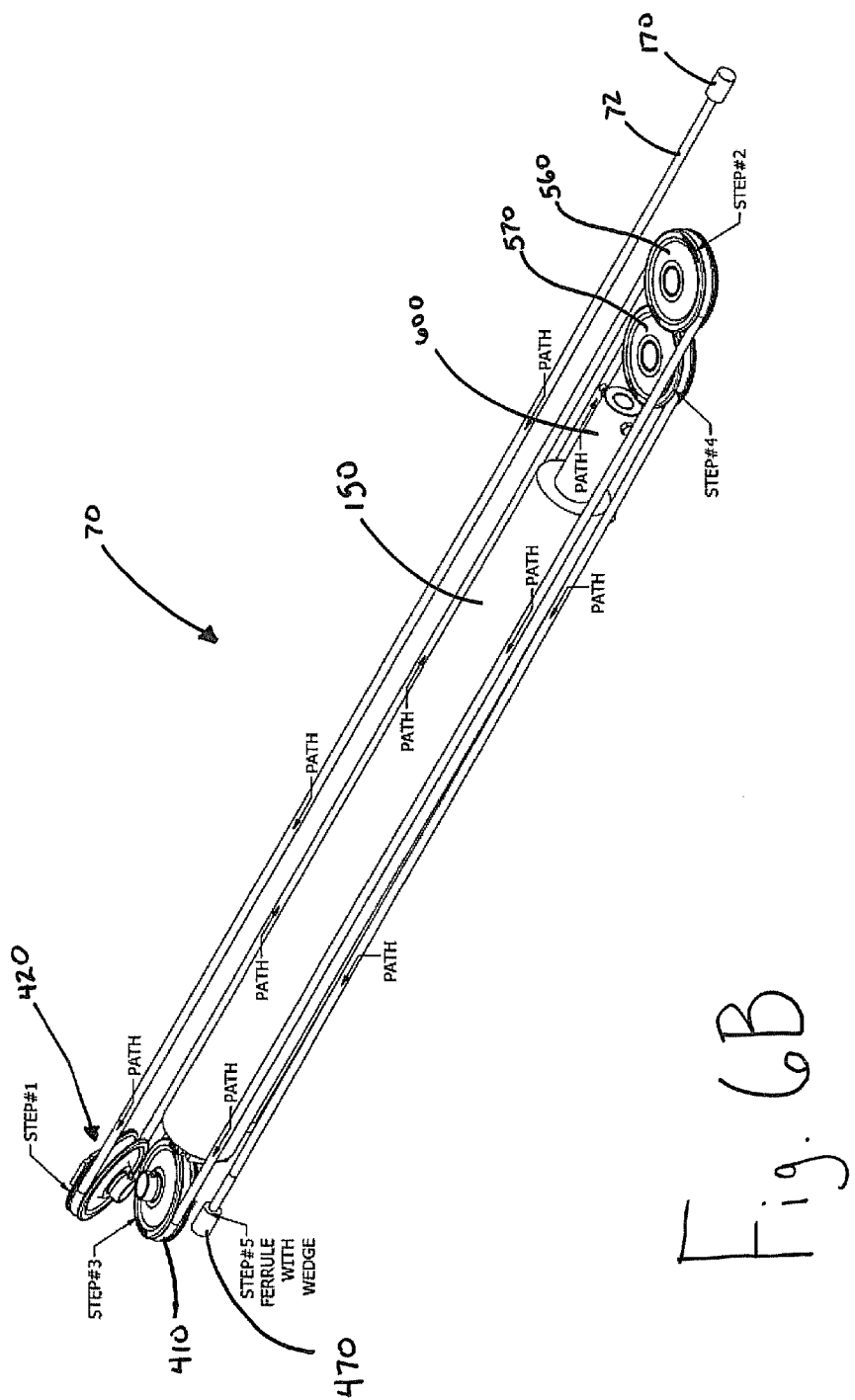

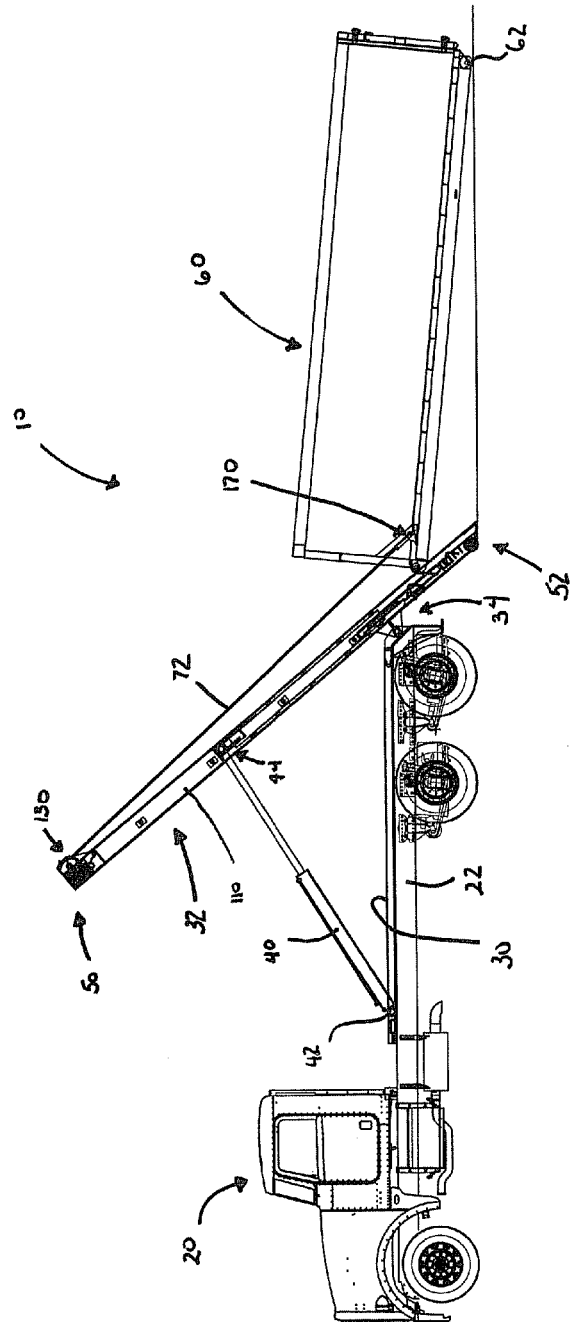

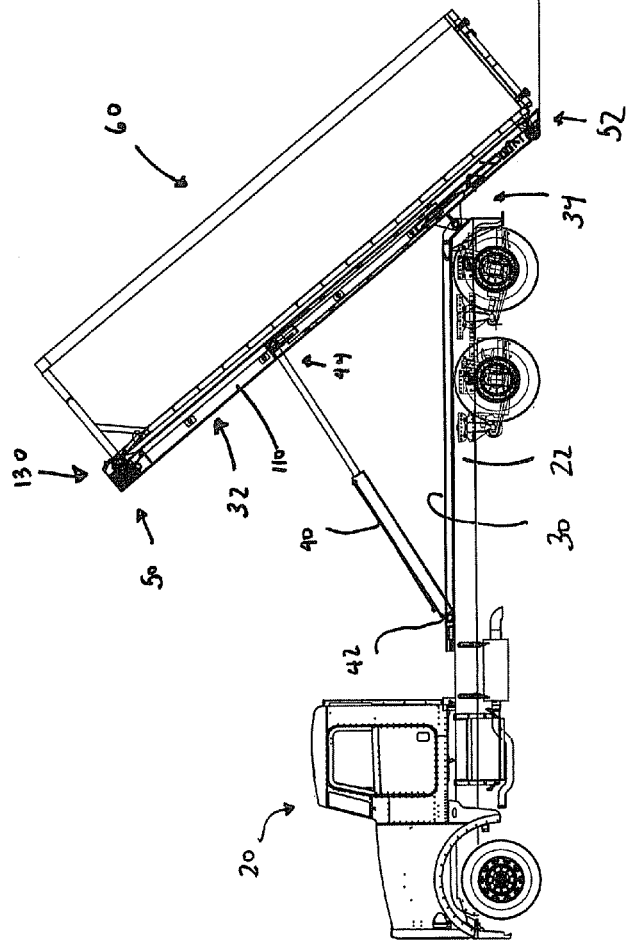

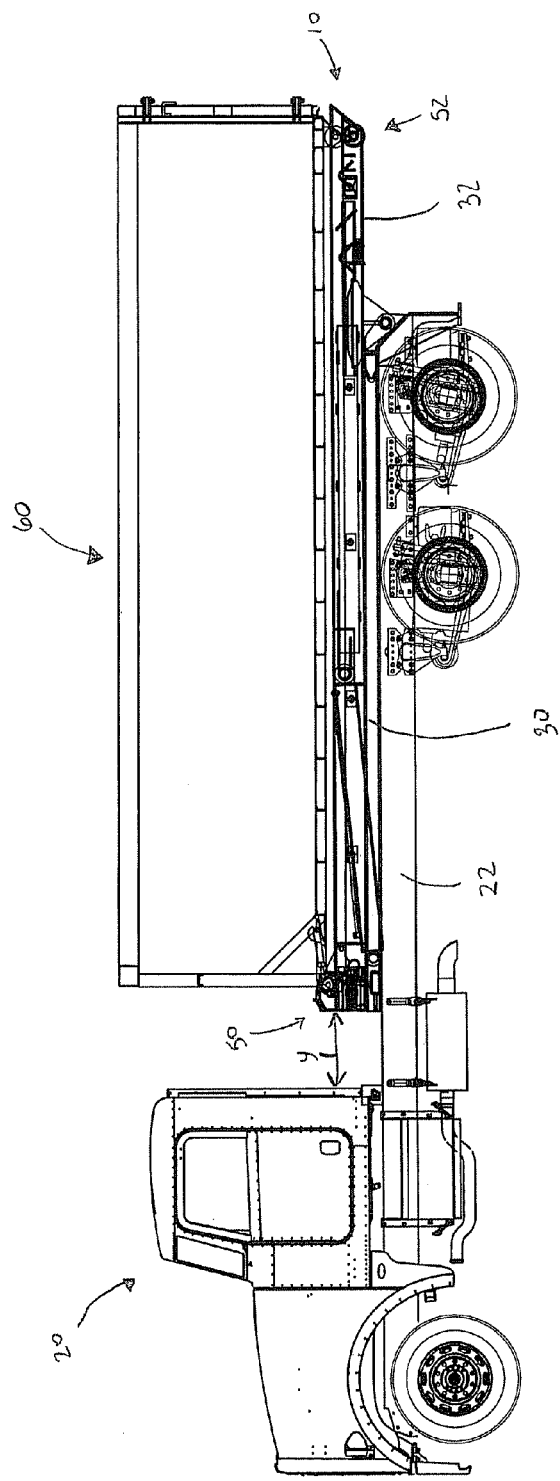

HOIST APPARATUS

RELATED APPLICATION

This application is a U.S. Non-Provisional patent application which claims priority to U.S. Provisional Patent Application Ser. No. 61/545,506, filed on Oct. 10, 2011 and titled "Hoist Apparatus," which is hereby incorporated by reference in its entirety.

TECHNICAL FIELD

The invention is generally applicable to a hoist apparatus. More specifically, the invention is applicable to a hoist apparatus for loading containers or other items onto a vehicle and for unloading the containers or other items therefrom. The hoist apparatus is particularly useful in connection with vehicles commonly referred to as "roll off" vehicles.

BACKGROUND OF INVENTION

Many vehicles include hoist apparatus for loading containers or other items onto the vehicle and for unloading the containers or other items therefrom. In particular, vehicles commonly known as "roll off" vehicles often include such hoist apparatus. A "roll off" vehicle is generally a vehicle which includes a vehicle body or trailer that is adapted to receive a container, such as a large refuse container, which are adapted to roll on and off of the vehicle. Roll off vehicles often include a hoist apparatus for facilitating the loading and unloading of the container. Such hoist apparatus often include a sub-frame that is mountable to the vehicle body or trailer and a main-frame that is pivotally mounted to the sub-frame that extends along the vehicle body and pivots upwardly relative to the sub-frame to create a ramp onto which a container can roll on or off. Commonly, such hoist apparatus include a cable winch system for drawing the container up onto the main-frame during the loading of the container and for easing the container off of the main-frame during the unloading of the container. Typically one or more pulleys or sheaves are utilized in connection with the operation of such cable winch system. Once the container is loaded onto the main-frame of the hoist apparatus, the main-frame may then be lowered, thereby loading the container onto the roll-off vehicle.

BRIEF DESCRIPTION OF THE DRAWINGS

FIG. 1 shows a side elevational view of one embodiment of a vehicle and hoist apparatus with a cable of a cable winch system of the hoist apparatus attached to a container;

FIG. 2A shows a rear perspective view of the hoist apparatus illustrated in FIG. 1 removed from the vehicle and in the raised position;

FIG. 2C shows a side elevational view of the hoist apparatus illustrated in FIG. 1 removed from the vehicle and in the raised position;

FIG. 3A shows a rear perspective view of the hoist apparatus illustrated in FIG. 1 removed from the vehicle and in the lowered position;

FIG. 4B shows a cross-sectional rear elevational view of the stationary sheave block illustrated in FIG. 4A;

FIG. 4E shows a top plan view of the stationary sheave block illustrated in FIG. 4A with the pulley housing of the second pulley and the parallel cross supports removed for illustrative purposes;

FIG. 4F shows a side elevational view of the stationary sheave block illustrated in FIG. 4A wherein the frame rails are transparent to illustrate the location of the first and second pulleys or sheaves within the stationary sheave block;

FIG. 4G shows a cross-sectional perspective view of the stationary sheave block illustrated in FIG. 4A with the pulley housing of the second pulley and the parallel cross supports removed for illustrative purposes;

FIG. 5A shows a perspective view of one embodiment of a moveable sheave carrier of the hoist apparatus illustrated in FIG. 1;

FIG. 5B shows a cross-sectional perspective view of the moveable sheave carrier illustrated in FIG. 5A;

FIG. 6B shows a perspective view of the cable path through the cable winch system of the hoist apparatus illustrated in FIG. 1 with the main-frame, stationary sheave block and moveable sheave carrier removed for illustrative purposes;

FIGS. 7A-7D show side elevational view of various stages of the loading of a container by the hoist apparatus illustrated in FIG. 1 onto a vehicle with the cable of the cable winch system attached to a container and drawing the container up onto the mainframe of the hoist apparatus;

FIG. 7E shows a side elevational view of the hoist apparatus illustrated in FIG. 1 in the lowered transporting position with a container loaded onto the vehicle.

DETAILED DESCRIPTION OF THE INVENTION

Figure 2B:
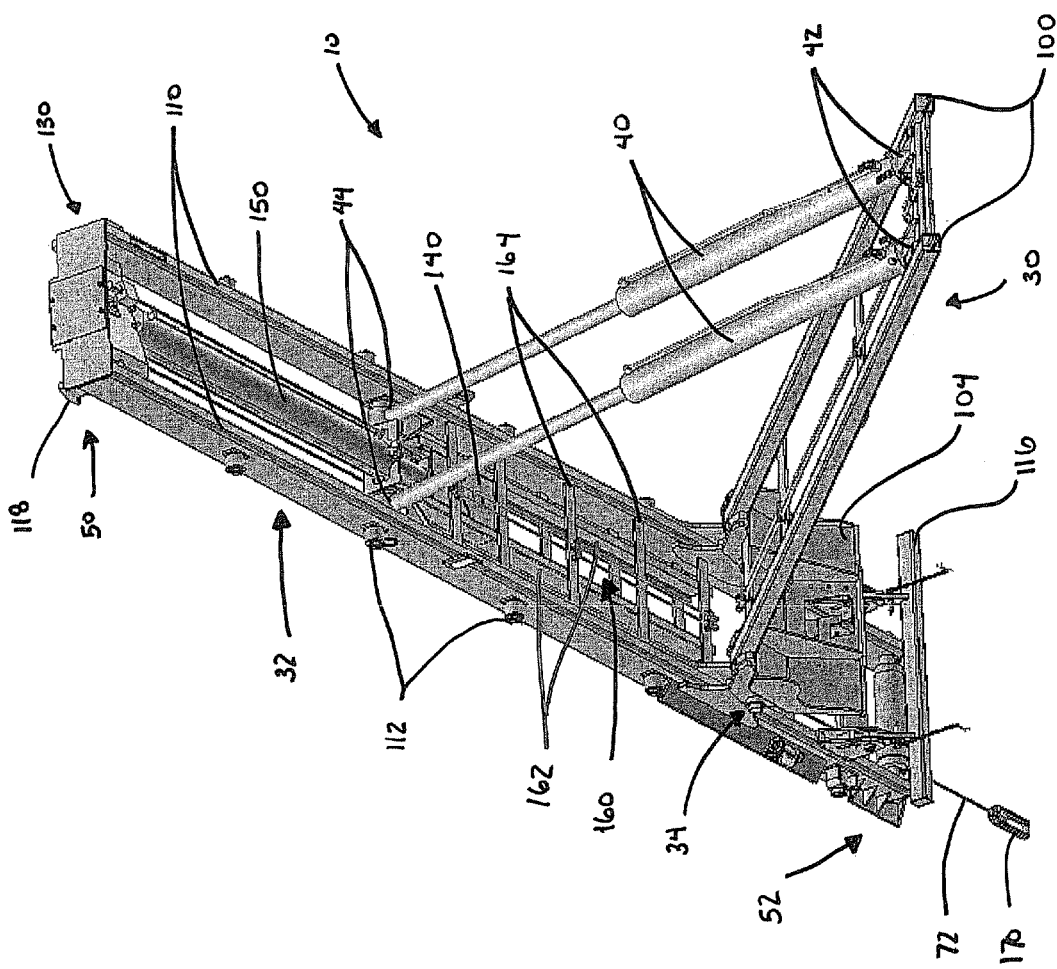
FIG. 2B shows a front perspective view of the hoist apparatus illustrated in FIG. 1 removed from the vehicle and in the raised position.
Figure 2D:
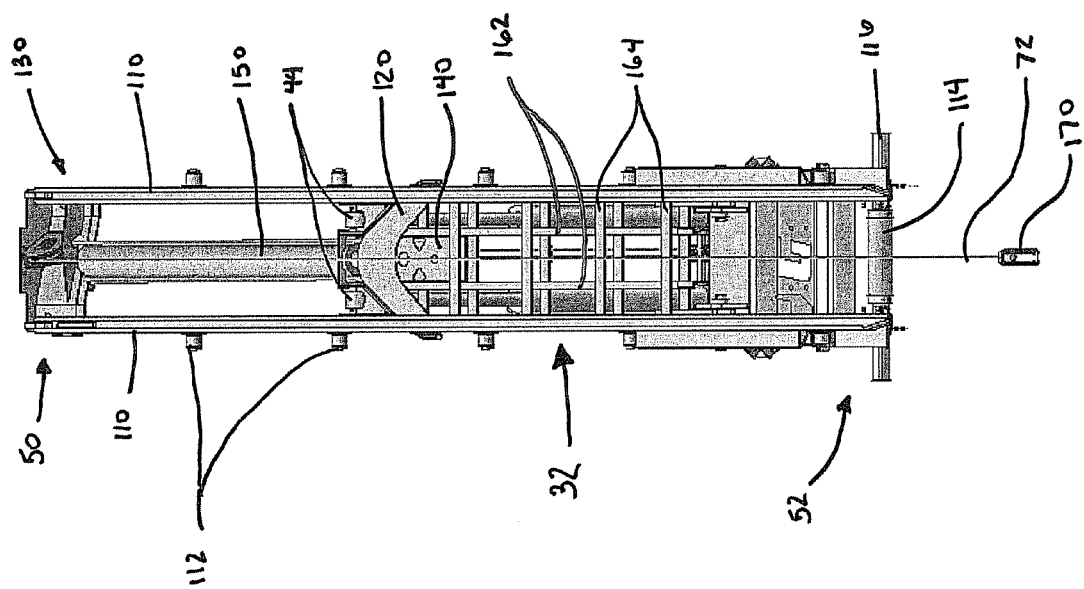
FIG. 2D shows a rear elevational view of the hoist apparatus illustrated in FIG. 1 removed from the vehicle and in the raised position.

The present invention will now be described with occasional reference to specific embodiments of the invention. This invention may, however, be embodied in different forms and should not be construed as limited to the embodiments set forth herein. Rather, these embodiments are provided so that this disclosure will fully convey the scope of the invention to those skilled in the art and are not intended to limit the scope of the invention in any way.

Also, while the detailed exemplary embodiments described in the specification and illustrated in the drawings relate to hoist apparatus for use with loading and unloading containers onto roll off vehicles, it should be understood that the hoist apparatus described herein may be used in connection with any type of vehicle or could be used to unload and unload items other than containers from a vehicle.

Except as otherwise specifically defined herein, all terms used herein have the same meaning as commonly understood by one of ordinary skill in the art to which this invention belongs. The terminology used in the description of the invention herein is for describing particular embodiments only, and is not intended to be limiting of the invention. As used in the description of the invention, the singular forms "a," "an," and "the" are intended to include the plural forms as well, unless the context clearly indicates otherwise.

Unless otherwise indicated, all numbers expressing quantities, properties, and so forth as used in the specification are to be understood as being modified in all instances by the term "about." Accordingly, unless otherwise indicated, the numerical properties set forth in the following specification are approximations that may vary depending on the desired properties sought to be obtained in embodiments of the present invention. Notwithstanding that the numerical ranges and parameters setting forth the broad scope of the invention are approximations, the numerical values to the extent that such are set forth in the specific examples are reported as precisely as possible. Any numerical values, however, inherently contain certain errors necessarily resulting from error found in their respective measurements.

The terms "pulley" and "sheave" as used herein, include any article which include a grooved rim or similar means for retaining and/or transmitting force to a cable, wire, belt, rope or similar device. The term "cable" as used herein, includes any flexible elongated member, such as a cord, wire, string, belt, rope or similar device.

According to one inventive aspect of the present invention, a hoist apparatus is provided that includes a pair of pulleys or sheaves of a stationary sheave block located on a front end of a main-frame of the hoist apparatus that are generally aligned with one another to conserve space at the front end of the main-frame of the hoist apparatus. The conservation of space at the front end of the main-frame of the hoist apparatus may provide space for additional items, such as components of a tarping system or other accessories or items, to be mounted to a vehicle body in a forward position relative to the hoist apparatus.

According to one inventive aspect of the present invention, a hoist apparatus is provided that includes a pair of pulleys or sheaves of a stationary sheave block located on a front end of a main-frame of the hoist apparatus that are generally aligned with one another to conserve space at the front end of the main-frame of the hoist apparatus. The conservation of space at the front end of the main-frame of the hoist apparatus may permit the hoist apparatus to be mounted to a vehicle body at a more forward position than otherwise possible, thereby providing for better weight distribution.

According to one inventive aspect of the present invention, a hoist apparatus is provided that includes one or more lifting cylinders that are located inwardly of a pair of rails of the main-frame. The location of the lifting cylinders inwardly of the rails of the main-frame allows the hoist apparatus to occupy less space on the vehicle body and provide space for mounting additional items to the vehicle body. For example, the space conserved by locating the lift cylinders inwardly relative to the main-frame may provide space on the vehicle body for the mounting of fuel tanks, or other items.

According to one inventive aspect of the present invention, a hoist apparatus is provided that includes a pair of pulleys or sheaves of a moveable sheave carrier, the pair of pulleys being mounted to the moveable sheave carrier in an offset manner relative to one another so that the axles of the pair of pulleys are not aligned with one another and are separately mounted to the moveable sheave carrier. The offset manner in which the pulleys are mounted to the moveable sheave carrier provides for improved greasing of the pulleys from both the standpoint of the ease of the greasing operation as well as the effectiveness of the greasing of the pulleys. The offset manner in which the pulleys are mounted to the moveable sheave carrier also serves to provide an increased bearing length and resistance to tilting or other similar dynamic movements.

According to one inventive aspect of the present invention, a hoist apparatus is provided that includes a pair of pulleys or sheaves of a stationary sheave block and a pair of pulleys or sheaves of a moveable sheave carrier, which are located, oriented and aligned relative to one another to in a manner that is adapted to reduce the wear and interference experienced by a cable travelling in a path around the four pulleys or sheaves.

According to one inventive aspect of the present invention, a hoist apparatus is provided that includes an elongated moveable sheave carrier that includes a pair of pulleys or sheaves mounted thereto. The elongated length of the moveable sheave carrier assists in preventing the twisting, tilting, rattling or other undesired movements of the moveable sheave carrier as it travels along a channel extending along a portion of the length of the hoist apparatus.

Features and advantages of the invention will be set forth in part in the description which follows, and in part will be obvious from the description, or may be learned by practice of the invention. The accompanying drawings, which are incorporated in and constitute a part of this specification, illustrate several embodiments of the invention, and together with the description, serve to explain the principles of the invention.

FIG. 1 shows one exemplary embodiment of a hoist apparatus 10 mounted onto a vehicle 20 having a vehicle body 22. Referring to FIG. 1, the hoist apparatus 10 generally includes a sub-frame 30 and a main-frame 32. The sub-frame 30 of the hoist apparatus 10 of the exemplary embodiment is mounted to the vehicle body 22. The main-frame 32 is pivotally mounted to the sub-frame 30 by pivotal mount 34. In various additional embodiments, the hoist apparatus 10 may be provided without a sub-frame 30, with the main-frame 32 being pivotally mounted directly to the vehicle body 22 of the vehicle 20.

The exemplary embodiment of hoist apparatus 10 includes a pair of powered mechanisms 40 such as fluid actuated lift cylinders (e.g., rod-type hydraulic cylinders), which are secured at one end to the sub-frame 30 by pivotal mounts 42 and at the opposite end to the main-frame 32 by pivotal mounts 44. The lift cylinders 40 serve to elevate the main-frame 32 from a lowered, generally horizontal transporting position to a raised, inclined position A (as shown in FIG. 1) used for the loading, unloading and/or dumping of containers. When the main-frame 32 is elevated to the raised, inclined position A, the main-frame 32 pivots about pivotal mount 34 to a titled position with a front end 50 of the main-frame 32 raised and a rear end 52 of the main-frame 32 lowered to or near the ground (as shown in FIG. 1).

When the main-frame 32 is in the raised, inclined position A, the main-frame 32 serves as a ramp or inclined surface upon which a container 60 can be slid or rolled to load the container 60 onto the hoist apparatus 10. The illustrated embodiment of container 60 includes a plurality of wheels or rollers 62 to assist in the loading of the container 60 onto the main-frame 32 of the hoist apparatus 10. However, container 60 may be provided without such wheels or rollers in additional embodiments. The container 60 may be provided with rails, skids, or any other suitable devices to assist in the rolling or sliding of the container or may be provided with a flat or otherwise shaped bottom without any such assisting devices. The hoist apparatus 10 of the present application may be adapted for use with a variety of suitable containers.

The illustrated embodiment of hoist apparatus 10 further includes a cable winch system 70 which includes a cable 72. As shown in FIG. 1, the cable 72 of the cable winch system 70 may be connected to container 60 and the cable winch system 70 operates to draw the container 60 up onto the main-frame 32 of the hoist apparatus 10 during the loading of the container 60 and to ease the container 60 down the main-frame of the hoist apparatus 10 during the unloading of the container 60 (as described in more detail herein). The cable 72 may include a container attachment element 170 for attaching the cable 72 to a container.

Figure 4A:
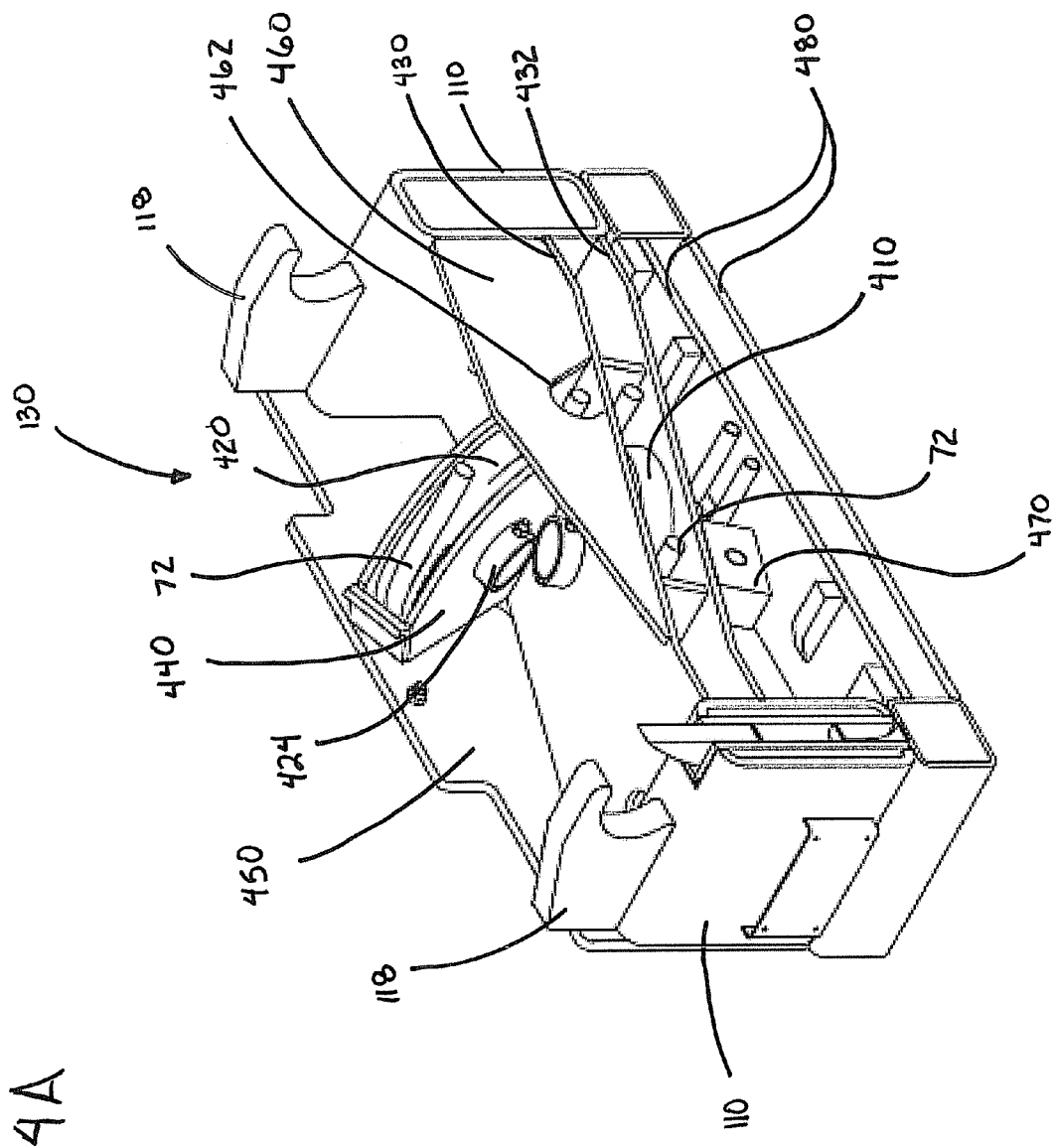
FIG. 4A shows a cross-sectional perspective view of one embodiment of a stationary sheave block of the hoist apparatus illustrated in FIG. 1.
Figure 4D:
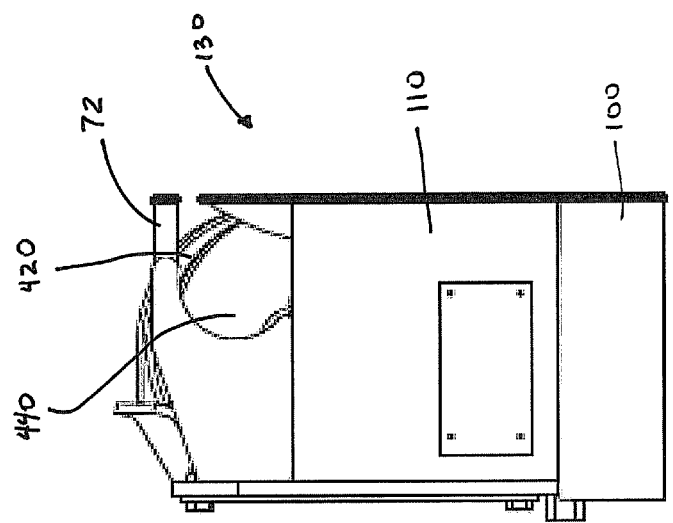
FIG. 4D shows a side elevational view of the stationary sheave block illustrated in FIG. 4A.
Figure 4C:
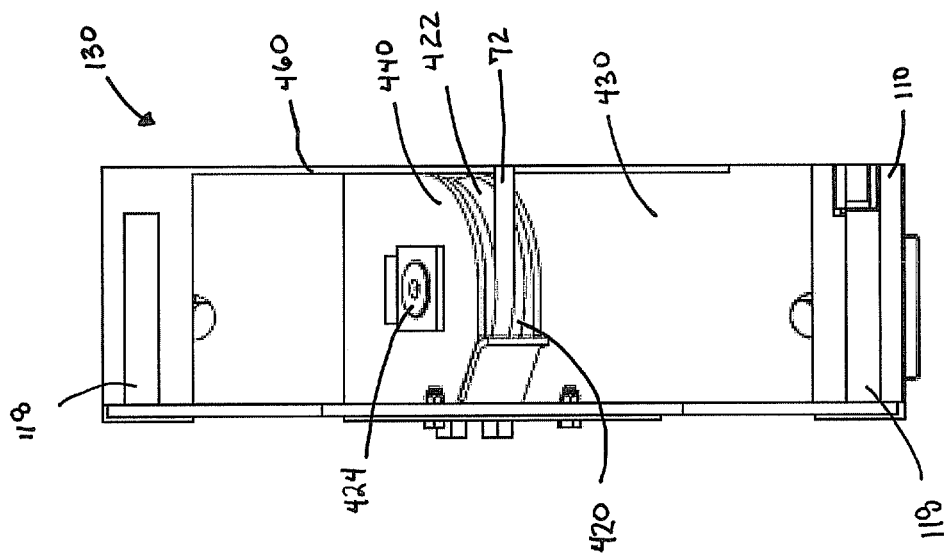
FIG. 4C shows a top plan view of the stationary sheave block illustrated in FIG. 4A.

Referring now to FIGS. 2A-2D, one exemplary embodiment of the hoist apparatus 10 is shown in the raised position, removed from the vehicle. As shown best in FIGS. 2A-2B, the sub-frame 30 of the illustrated embodiment of hoist apparatus 10 includes a pair of frame rails 100, which may be strengthened by one or more cross-members 102. The sub-frame 30 also includes apron 104 which aligns with the rear end of vehicle body 22 when the sub-frame 30 is attached to the vehicle body. As best shown in FIGS. 4A-4B, sub-frame 30 includes cross members 480 that span between the frame rails 100 near the front end of the sub-frame to strengthen and stabilize sub-frame 30. The sub-frame 30 may be attached the vehicle body 22 using a variety of suitable attachment methods, such as conventional nuts, bolts, welds, or other suitable attachment methods. The shape and configuration of the sub-frame 30 may vary in various embodiments and is not limited to the shape and configuration of the illustrated exemplary embodiment. For example, in additional embodiments, the sub-frame 30 may be a simple planar body and not include a pair of frame rails.

The main-frame 32 of the illustrated exemplary embodiment of hoist apparatus 10 includes a pair of frame rails 110 which define a support surface adapted to receive and support a container or other item that is rolled or slid onto the main-frame 32. The frame rails 110 of the illustrated embodiment are tubular, having a generally hollow rectangular cross-sectional shape (as shown, for example, in FIG. 4A). However, the frame rails 110 of the main-frame 32 may have a variety of additional shapes in additional embodiments. For example, the frame rails 110 may be I-beams or have some other suitable shape in additional embodiments.

The main-frame 32 of hoist apparatus 10 includes a plurality of rollers 112 located on the side of the frame rails 110 for assisting in supporting the container as it is rolled or slid onto the main frame 32. In additional embodiments, the rollers 112 may be adjustably mounted to the frame rails 110 to accommodate a variety of different types and sizes of containers. Any number of such rollers 112 may be provided. Additional embodiments of hoist apparatus 10 may be provided without such rollers 112 or may have a variety of different types of such rollers. For example, additional embodiments of hoist apparatus 10 may include rollers which project upwardly from the top surface of the frame rails 110. In additional embodiments, the frame rails 110 of main-frame 32 may include channels defined therein or one or more projections extending therefrom to further assist in supporting and/or aligning a container or other item as it is rolled or slid onto the frame rails 110.

The main-frame 32 of hoist apparatus 10 includes one or more rear roller 114 located near the rear end 52 of the main-frame 32. Rear roller 114 serves to facilitate the positioning of the main-frame 32 relative to the ground or other support surface when the main-frame 32 is in the raised position. When the main-frame 32 is in the raised position, the rear roller 114 may come in contact with and roll along the ground or other support surface to allow for the movement and adjustment of the main-frame 32 necessary to locate and orient the main-frame 32 in the desired position relative to the ground or other support surface for the loading or unloading of a container. In the illustrated exemplary embodiment, a rear under-ride bumper 116 is attached to the main frame 32 near the rear end 52. Additional embodiments of the hoist apparatus may be provided without such a bumper 116 or rear roller 114.

The main frame 32 of hoist apparatus 10 includes a pair of front hooks 118 located near the front end 50 of the main frame 32. Front hooks 118 serve to engage with and secure the container or other item loaded onto the main frame 32 and prevent the container from moving relative to the main-frame. Additional embodiments of the hoist apparatus may be provided without such front hooks 118 and may be provided with a variety of additional securing elements for securing the container.

The frame rails 110 of the illustrated embodiment of main-frame 32 are strengthened and reinforced by a plurality of cross members 120, 122. In the illustrated embodiment, cross member 120 has a generally arcuate shape and cross members 122 are angle irons with a generally "L" shaped cross section to provide the desired stress distribution, stability and strength. Any number of such cross members may be provided. Various additional embodiments of main-frame 32 may include a variety of different types of cross members having a variety of different shapes and configurations.

Figure 3B:
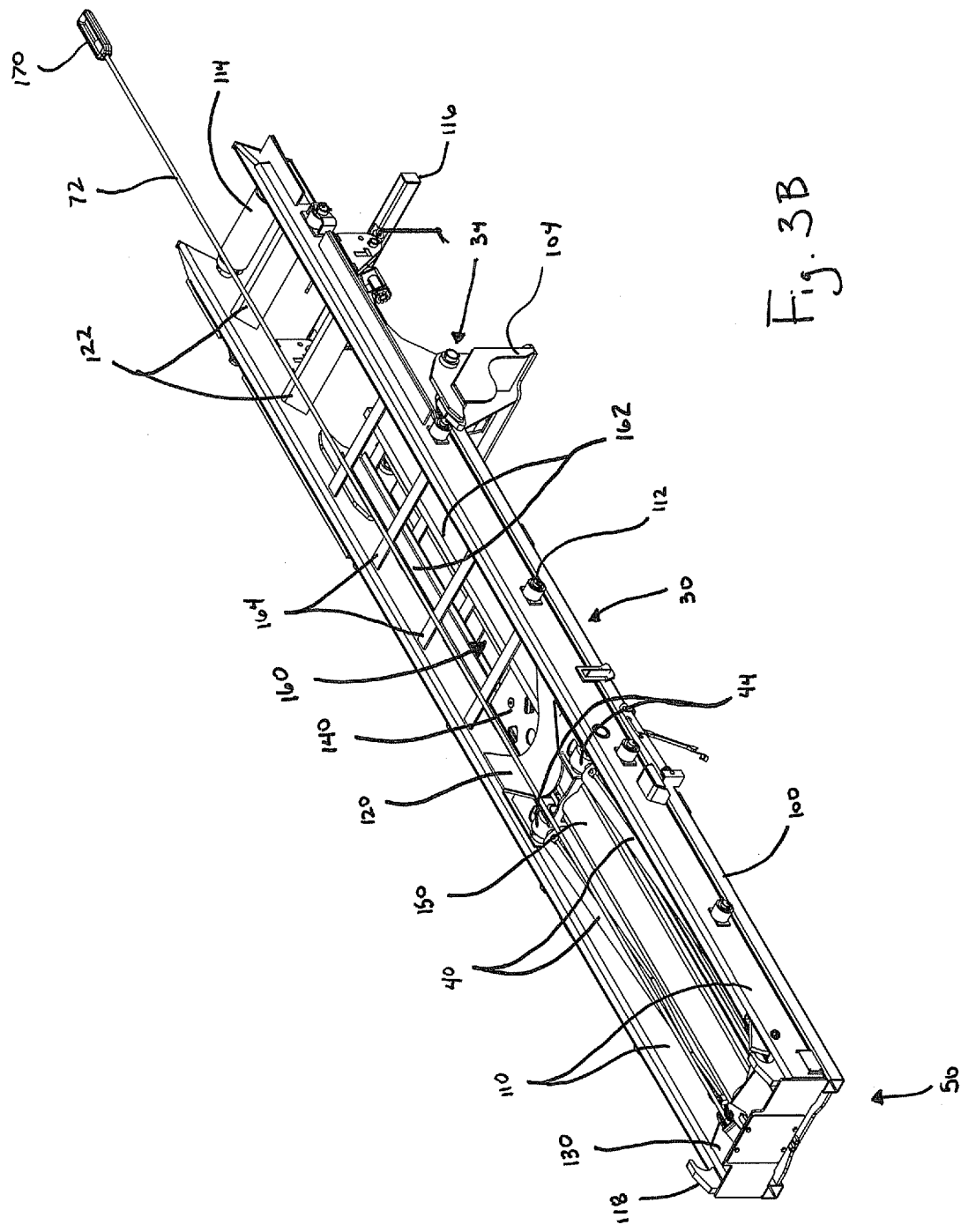
FIG. 3B shows a front perspective view of the hoist apparatus illustrated in FIG. 1 removed from the vehicle and in the lowered position.
Figure 3C:
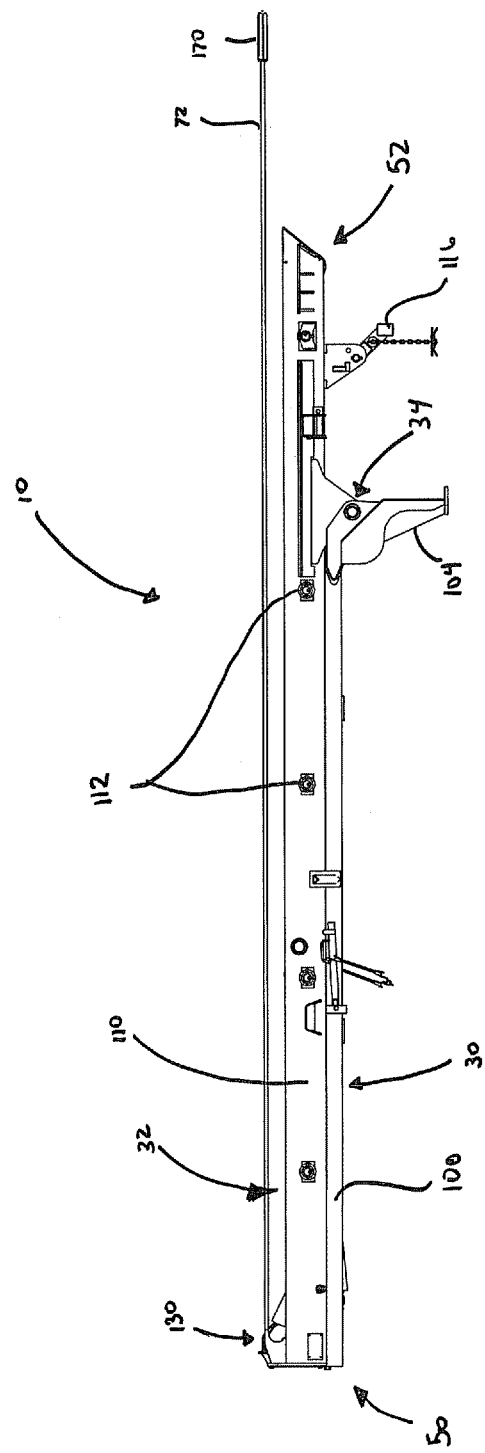
FIG. 3C shows a side elevational view of the hoist apparatus illustrated in FIG. 1 removed from the vehicle and in the lowered position.
Figure 3D:
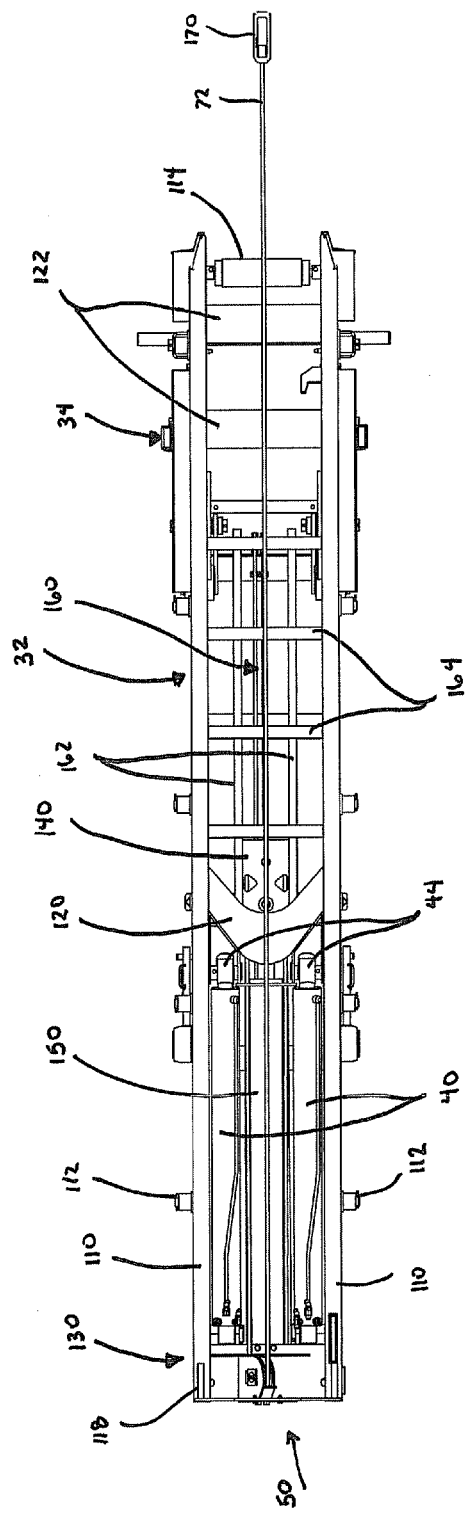
FIG. 3D shows a top plan view of the hoist apparatus illustrated in FIG. 1 removed from the vehicle and in the lowered position.
Figure 3E:
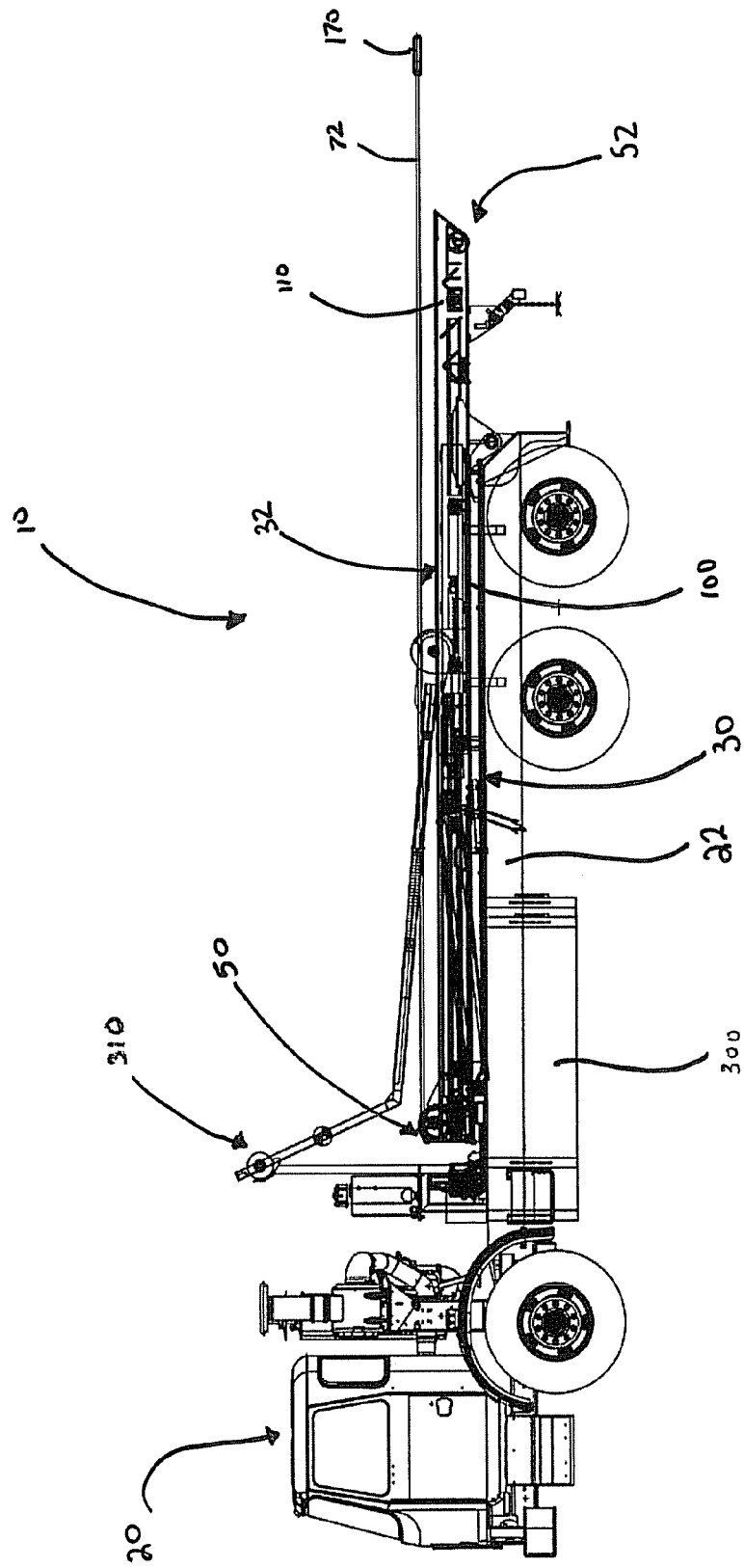
FIG. 3E shows a side elevational view of the hoist apparatus illustrated in FIG. 1 mounted on a vehicle and in the lowered position.
Figure 3F:
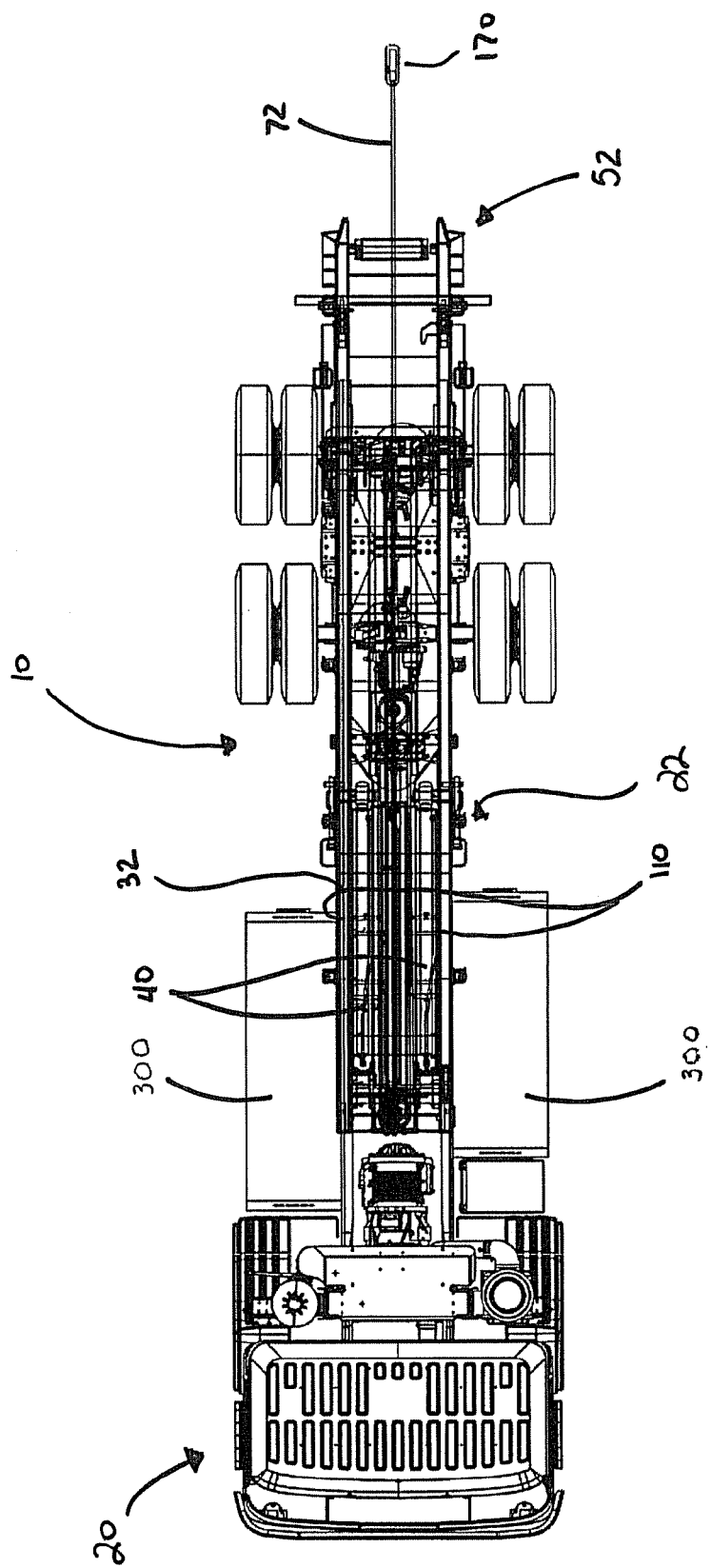
FIG. 3F shows a top plan view of the hoist apparatus illustrated in FIG. 1 mounted on a vehicle and in the lowered position.

Referring now to FIGS. 3A-3D, the exemplary embodiment of the hoist apparatus 10 is shown in the lowered position, removed from the vehicle. FIGS. 3E-3F illustrate the exemplary embodiment of the hoist apparatus 10 shown in the lowered position and mounted to a vehicle. As best illustrated in FIG. 3F, the lift cylinders 40 are located in the space defined between the frame rails 110 of the main-frame 32 of the hoist apparatus 10 when the hoist apparatus is in the lowered position. The shape and configuration of the main frame 32 and the shape, location and configuration of the lift cylinders 40 and other components of the hoist apparatus 10 are adapted to provide space between the frame rails 110 of the main-frame for the receipt of the lift cylinders 40 when the hoist apparatus 10 is in the lowered position. The location of the lift cylinders 40 inwardly of the frame rails 10 provides a variety of benefits, including reducing the space on the vehicle body 22 of the vehicle that is occupied by the hoist apparatus 10. The exemplary embodiment of hoist apparatus 10 illustrated in FIG. 3F occupies less space on the vehicle body 22 than a conventional hoist apparatus that includes lift cylinders located outwardly of the frame rails of the main-frame of the hoist apparatus. As shown in FIG. 3F, the additional space on the vehicle body 22 provided by reducing the size occupied by the hoist apparatus can be utilized for mounting other items to the vehicle body 22, such as fuel tanks 300. Due to the fact that the exemplary embodiment of hoist apparatus 10 described herein occupies less space on the vehicle body 22 of the vehicle 20 than conventional hoist apparatus, additional space is provided on the vehicle body for the mounting of large capacity fuel tanks or the larger fuel tanks normally associated with the use of natural gas. It should be understood that additional embodiments of the hoist apparatus may include lift cylinders 40 that are located outwardly of the frame rails 110 of the main-frame 32 and the hoist apparatus described herein is not limited to a construction that includes lift cylinders 40 located inwardly of the frame rails 110.

Referring again to FIGS. 2A-2D, the cable winch system 70 generally includes a cable 72, a stationary sheave block 130, a moveable sheave carrier 140, and a powered winch mechanism 150, such as a fluid actuated cylinder (e.g., rod-type hydraulic cylinder). The stationary sheave block 130 is fixedly mounted to the main-frame 32 near the front end 50. The main-frame 32 of the illustrated embodiment of the hoist apparatus 10 includes a sheave carrier channel 160 located between the rails 110 of the main-frame 32 that is adapted to receive the moveable sheave carrier 140 therein for reciprocal movement longitudinally along the main-frame 32. The sheave carrier channel 160 is formed by a pair of parallel tracks 162 which define an open space therebetween. The sheave carrier channel 160 is supported by and mounted to the main-frame 32 by a plurality of cross-members 164 which span the distance between the frame rails 110 of the main-frame 32.

One end of the cable 72 is mounted to a portion of the stationary sheave block 130 or other portion of the main-frame 32. The cable 72 extends about a plurality of sheaves, at least two of which are rotatably mounted to the stationary sheave block 130 and at least two of which are rotatably mounted to the moveable sheave carrier 140 (as described in more detail herein). A container attachment element 170 is located at a free end of the cable 72 for removably attaching the cable 72 to a container for use in loading or unloading the container on and off of the main-frame 32 of the hoist apparatus 10.

Referring now to FIGS. 4A-4G, an exemplary embodiment of the stationary sheave block 130 is shown in more detail. The stationary sheave block 130 of the illustrated embodiment includes a first pulley or sheave 410 and a second pulley or sheave 420. As best illustrated in FIG. 4B, the first pulley 410 is mounted between a pair of cross supports 430, 432 that span the distance between the frame rails 110 of the main-frame 32. In the illustrated embodiment of stationary sheave block 130, the cross supports 430, 432 are angled to extend from the lower portion 434 of one frame rail 110 to the upper portion 436 of the opposing frame rail 110. The shaft 412 of the first pulley 410 is mounted to the cross supports 430, 432, thus mounting the first pulley 410 to the stationary sheave block 130. Due to the sloped or angled configuration of the cross supports 430, 432, the first pulley 410 is mounted to the stationary sheave block at an angle α relative to plane B-B extending between and generally perpendicular to the rails 110. In the illustrated embodiment of stationary sheave block 130, angle α is approximately 14°. In various embodiments of the hoist apparatus 10, first pulley 410 may be mounted to the stationary sheave block 130 at an angle α ranging between approximately 0° to approximately 25°. However, in yet additional embodiments, angle α may be a variety of different angles. Cable receiving groove 412 is defined in the outer periphery of first pulley 410 for receiving cable 72.

As best illustrated in FIGS. 4A-4B, the second pulley or sheave 420 of the illustrated embodiment of stationary sheave block 130 is housed within pulley housing 440 which projects upwardly from upper cross support 430. Due to the configuration and location of pulley housing 440, second pulley 420 is located at an angle 13 relative to plane B-B extending between and generally perpendicular to the rails 110. In the illustrated embodiment of stationary sheave block 130, angle β is approximately 62°. In various embodiments of the hoist apparatus 10, second pulley 420 be mounted to the stationary sheave block 130 at an angle β ranging between approximately 50° to approximately 75°. However, in yet additional embodiments, angle β may be a variety of different angles. Cable receiving groove 422 is defined in the outer periphery of second pulley 420 for receiving cable 72.

The stationary sheave block 130 includes a front plate 450 and a rear plate 460 that define a partially enclosed space therebetween. The front plate 450 and rear plate 460 serve to partially enclose second pulley 420 and to protect second pulley 420 from the elements, such as rain, snow, sleet, and from the entry of dirt or debris. The front plate 450 and rear plate 460 provide a mounting surface for the mounting of optional stationary sheave block cover (not shown) for further protecting the various components of the stationary sheave block 130. An opening 462 is defined through rear plate 460 to permit the passage of cable 72 extending from the cable receiving groove 422 of second pulley 420. Stationary sheave block 130 further includes cable mounting block 470 located on the underside of lower cross support 432 for affixing an end of cable 72 to the stationary sheave block 130. In additional embodiments, the cable 72 may be affixed to various components of the stationary sheave block 130 or other portions of the main-frame 32.

As best illustrated in FIGS. 4E-4F, first pulley 410 and second pulley 420 are aligned with one another so that neither pulley 410 or 412 is located more forward or rearward along the length of the main-frame 32 than the other of pulley 410, 212. Shaft 414 of pulley 410 and shaft 424 of pulley 424 are both generally centered along plane C-C which extends generally perpendicularly to rails 110. The alignment of pulleys 410, 420 is a space saving feature that provides several advantages. For example, the alignment of pulleys 410, 420 with one another provides for a more compact stationary sheave block 130 than would otherwise be possible if the pulleys were offset from one another along the length of the main-frame 32 as with conventional hoist apparatus 10.

The space savings provided by a more compact stationary sheave block 130 results in a variety of benefits. For example, in various embodiments of hoist apparatus 10, the more compact stationary sheave block 130 provides space on the vehicle body 22 forward of the front end 50 of hoist apparatus 10 when the hoist apparatus is in the lowered, transport position (as shown in FIG. 3E-3F). This additional space provided on the vehicle body 22 by the compact sheave block 130 can be used to mount one or more safety accessories or other items, such as a taming system 310, or various other items, onto the vehicle body 22 without interfering with or contacting the hoist apparatus 10. In various additional embodiments of hoist apparatus 10, the compact stationary sheave block 130 permits the hoist apparatus 10 to be mounted to the vehicle body 22 at a more forward position than would otherwise be possible with a hoist apparatus with a conventionally configured stationary sheave block. The mounting of the hoist apparatus 10 more forwardly on the vehicle body provides for improved weight distribution of the hoist apparatus 10 on the vehicle 20.

However, it should be understood that pulleys 410 and 420 may be offset from one another along the length of main-frame 32 in additional embodiments of the hoist apparatus. For example, in various additional embodiments of hoist apparatus 10, pulley 410 or 420 may be located between approximately 0 inches to 2 inches forward of the other of pulley 410 or 420 along the length of main-frame 32. In yet additional embodiments, one of pulley 410 or 420 may be located a variety of different additional distances forward of the other pulley 410 or 420, up to, for example, 10 inches or more.

Referring now to FIGS. 5A-5F, an exemplary embodiment of the moveable sheave carrier 140 is shown in more detail. The moveable sheave carrier 140 of the illustrated embodiment includes a top wall 510, bottom wall 520 and a pair of sidewalls 530 which combine to define a partially enclosed space therebetween. A central dividing wall 540 divides the enclosed space of the moveable sheave carrier 140 into a top compartment 542 and a bottom compartment 544. A winch cylinder attachment element 550 extends from one end of the moveable sheave carrier 140 for attachment of the of winch cylinder 150 to the moveable sheave carrier 140.

Figure 5C:
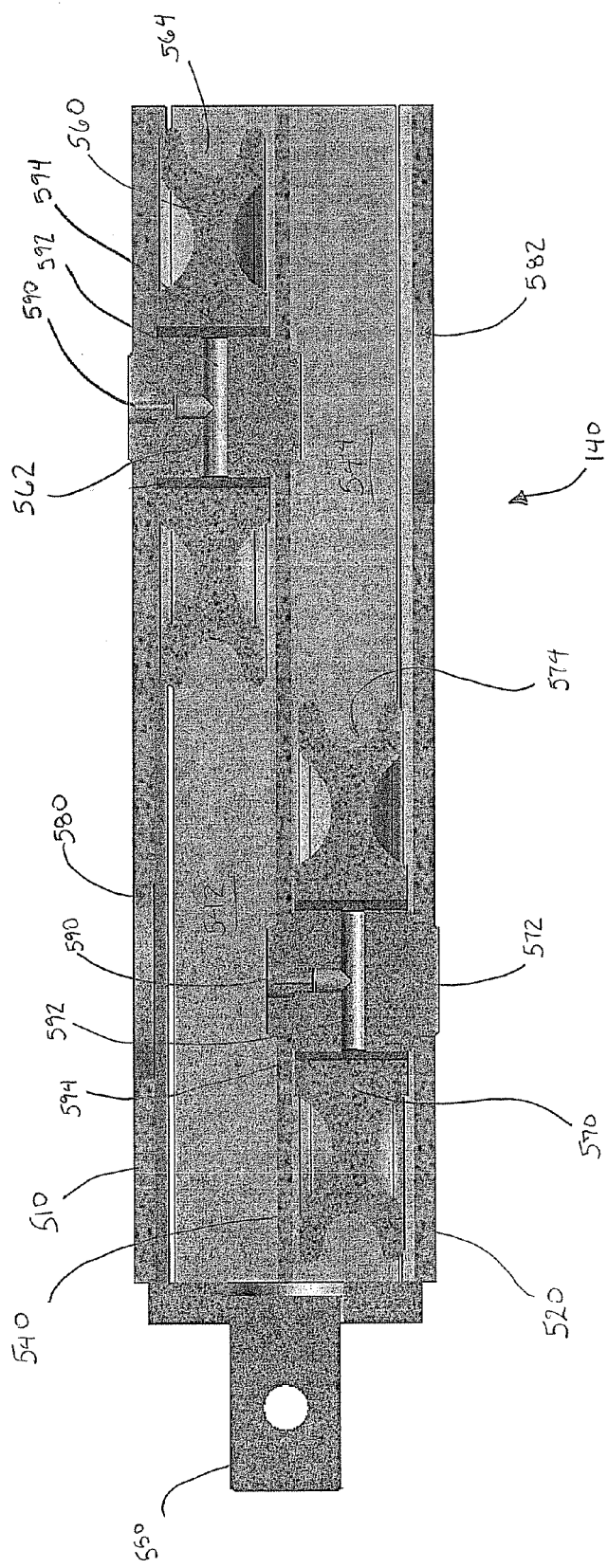
FIG. 5C shows a cross-sectional side elevational view of the moveable sheave carrier illustrated in FIG. 5A.
Figure 5D:
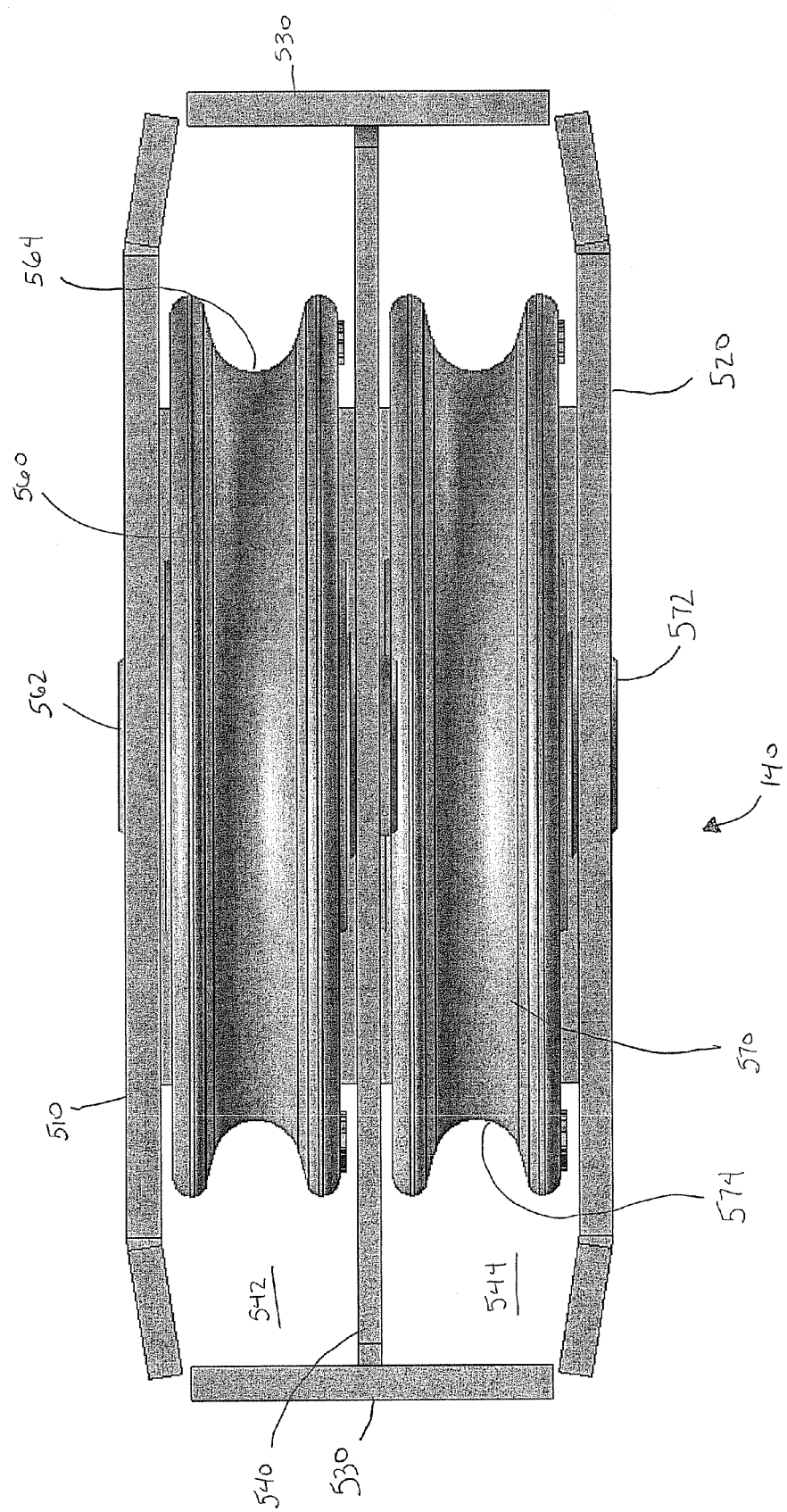
FIG. 5D shows a rear elevational view of the moveable sheave carrier illustrated in FIG. 5A.
Figure 5E:
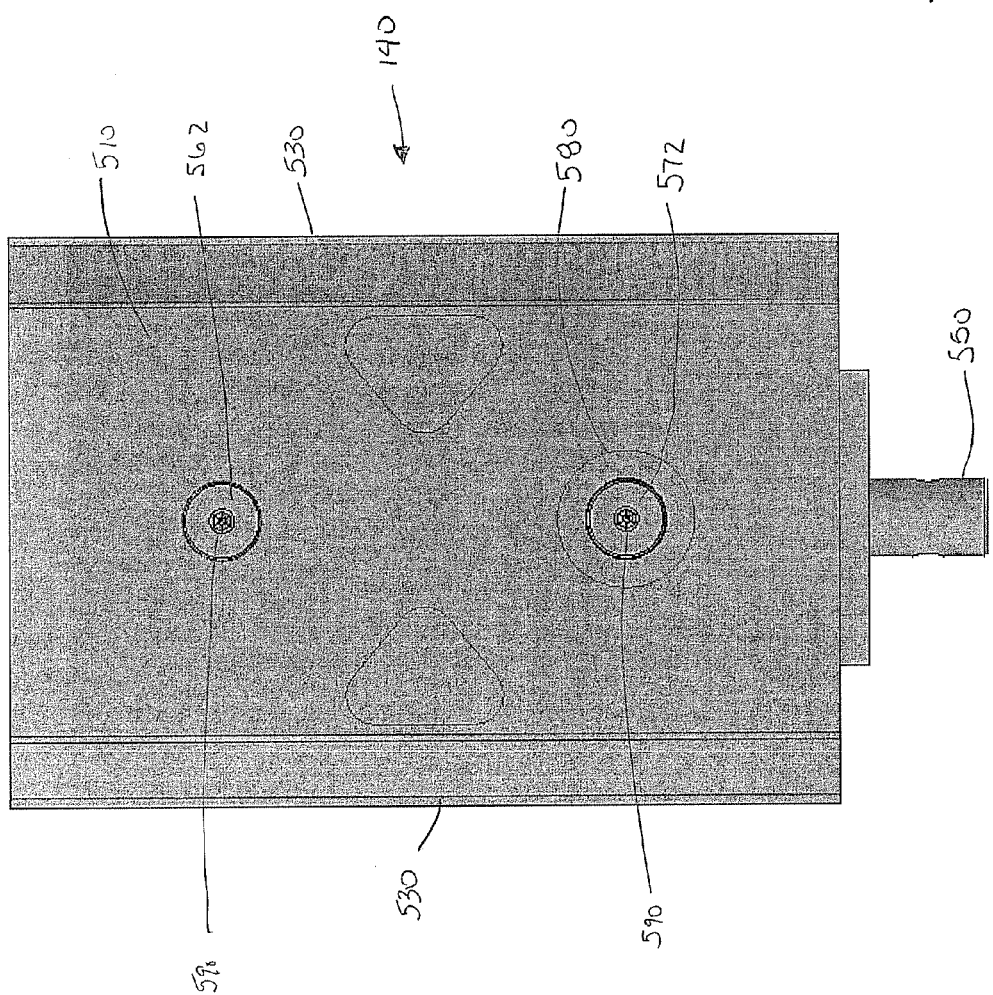
FIG. 5E shows a top plan view of the moveable sheave carrier illustrated in FIG. 5A.
Figure 5F:
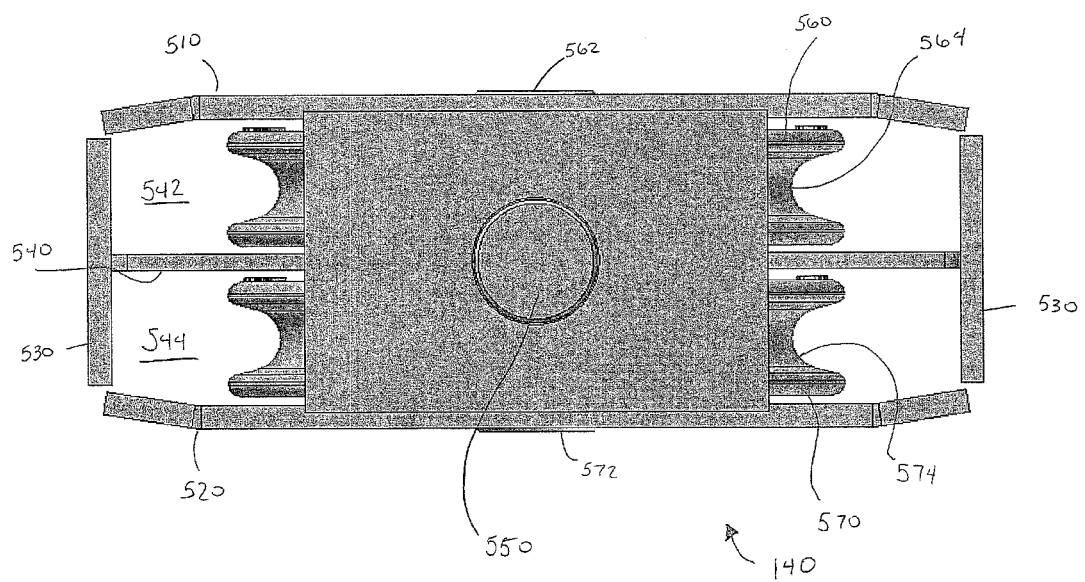
FIG. 5F shows a front elevational view of the moveable sheave carrier illustrated in FIG. 5A.

As best illustrated in FIG. 5B-5D, a third pulley 560 is mounted within the top compartment 542 of the moveable sheave carrier 140 with a shaft 562 of third pulley 560 being mounted between top wall 510 and central dividing wall 540. Cable receiving groove 564 is defined in the outer periphery of third pulley 560 for receiving cable 72. A fourth pulley 570 is mounted within bottom compartment 544 of the moveable sheave carrier 140 with a shaft 572 of fourth pulley 570 being mounted between central dividing wall 540 and bottom wall 520. Cable receiving groove 574 is defined in the outer periphery of fourth pulley 570 for receiving cable 72. As best illustrated in FIG. 5C, third pulley 560 and fourth pulley 570 are offset relative to one another within moveable sheave carrier 140 so that no portion of third pulley 560 resides in the vertical space above fourth pulley 570 when the moveable sheave carrier 140 is in a generally horizontal position. However, in additional embodiments, pulleys 560, 570 may be axially aligned with one another or may overlap one another so that a portion of third pulley 560 extends into the vertical space above fourth pulley 570.

Referring to FIGS. 5B-5C, an opening 580 is defined within top wall 510 of the moveable sheave carrier 140 to provide access to shaft 572 of fourth pulley 570 from the top of moveable sheave carrier 140. Similarly, an opening 582 is defined within bottom wall 520 of the moveable sheave carrier 140 to provide access to shaft 562 of third pulley 560 from the bottom of moveable sheave carrier 140. The shafts 562, 572 of pulleys 560, 570 include a fitting 590 for receiving grease, such as a grease zerk fitting which is well known in the art. The fitting 590 which is in fluid communication with channel 592, which extends outwardly through the shaft in a transverse direction to the axis of the shaft and is, in-turn, in fluid communication with bearing surface 594 of pulleys 560, 570. When desired, either pulley 560 and/or pulley 570 can be greased by connecting a greasing device, such as a grease gun (not shown), to the grease fitting 590 of pulley 560 or pulley 570. The pressure produced by the greasing device urges grease through the grease fitting 590 and into channel 592. The grease travels through channel 592 and exits to the bearing surface 594 of pulleys 560, 570. The fitting 590 of shaft 562 of third pulley 560 is accessible from the top wall 510 of the moveable sheave carrier 140.

Opening 580 provides access to the fitting 590 of fourth pulley 570 from the top wall 510 of the moveable sheave carrier 140. In this manner the bearing surface 594 of pulleys 560, 570 can be greased during operation from a position above the moveable sheave carrier 14—without the need to disassemble the moveable sheave carrier 140 or other components of the hoist apparatus 10. Since pulleys 560, 570 are mounted to the moveable sheave carrier 140 in an offset manner and their respective shafts 562, 572 are located at a distance from one another, the pulleys 560, 570 can be separately greased in a customized manner as desired by the user. If only one pulley needs to be greased and not the other, the greasing device can simply be affixed to the appropriate fitting 590 to grease the desired pulley.

In conventional hoist apparatus, pulleys 560, 570 are generally mounted one on top of the other, with the pulleys being in axial alignment with one another. In such configurations, one or more grease fittings are provided at the top end of the stacked pulleys.

If one grease fitting is provided with such a pair of stacked pulleys, both of the pulleys are greased by attaching a greasing device to the singular grease fitting. The grease then travels through the grease fitting and into a channel that extends through both pulleys. A portion of the grease exits this channel to come in contact with the bearing surface of the top pulley. A remaining portion of the grease continues down the channel to come in contact with the bearing surface of the lower pulley in the stack. This approach can lead to an unequal greasing of the bearing surfaces of the top and bottom pulleys in the stack. A user has little control over how the grease is apportioned or allocated to each of the pulleys. Also, it is difficult to ascertain how much grease, if any, reached both of the pulleys.

If a pair of grease fittings are provided with such a pair of stacked pulleys, the grease fitting dedicated to the greasing of the lower pulley is generally located on the top of the pulley stack. The grease from the greasing device enters the grease fitting and then must travel down a channel extending through the top pulley until it reaches the lower pulley to come in contact with the bearing surface of the lower pulley. This configuration also gives rise to inefficiencies and uncertainty with respect to the effectiveness of the greasing operation with respect to the lower pulley. The longer the channel that the grease must travel through becomes, the more difficult it is to effectively deliver the grease through the channel. Also, such long channels are more prone to becoming obstructed by dirt or debris.

Figure 6A:
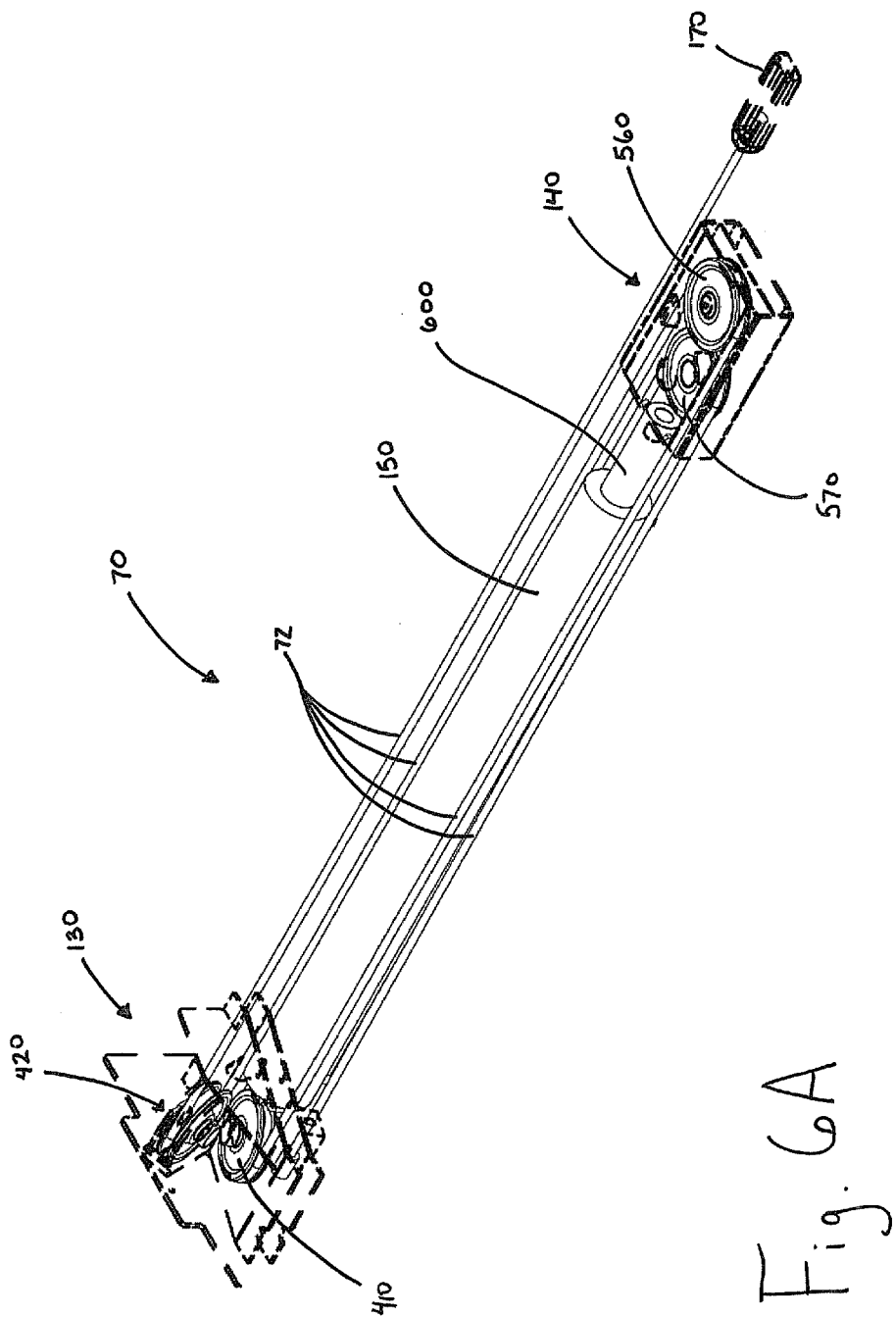
FIG. 6A shows a perspective view of the cable path through the cable winch system of the hoist apparatus illustrated in FIG. 1 with the main-frame removed for illustrative purposes and the stationary sheave block and moveable sheave carrier shown in broken lines to illustrate the location of the pulleys.

Referring now to FIGS. 6A-6B, the path of the cable 72 through the cable winch system 70 of the exemplary embodiment of hoist apparatus 10 is shown schematically. The cable travels from container attachment element 170 along the length of the main-frame toward the stationary sheave block 130 located at the front end 50 of the main-frame 32. The cable 72 enters the cable receiving groove 422 of the second pulley 420 and travels around the periphery of the second pulley 420. The cable 72 then travels along the length of the main-frame 32 toward the moveable sheave carrier 140 and enters the cable receiving groove 562 of third pulley 560. The cable 72 travels around the periphery of third pulley 560 and returns to stationary sheave block 130 where it enters the cable receiving groove 412 of first pulley 410. After travelling around the periphery of first pulley 410, the cable 72 returns to the moveable sheave carrier 140 where it enters the cable receiving groove 572 of the fourth pulley 570, travels around the periphery of the fourth pulley 570 and returns to the stationary sheave block 130. A free end of the cable 72 is attached to the cable mounting block 470 of the stationary sheave block 130 or some other portion of the hoist apparatus 10.

The position, location and orientation of each of the pulleys 410, 420, 560, 570 of the cable winch system 70 of the exemplary embodiment of the hoist apparatus 70 are adapted and designed to minimize any obstructions or interference of the cable 72 as the cable travels along this path through the cable winch system. Similarly, the position, location and orientation of each of the pulleys 410, 420, 560, 570 of the cable winch system 70 of the exemplary embodiment of the hoist apparatus 70 are adapted and designed to minimize any occurrences of the cable 72 rubbing against itself or other components of the hoist apparatus. For example the angle β of the second pulley 420 is adapted and designed to prevent the cable 72 from rubbing against itself or experiencing interference with other components of the hoist apparatus 10 as it travels from the container attachment element 170, around the second pulley 420 and back to the third pulley 560. The angle β of the second pulley 420 is adapted to provide the desired change in the level and location of the cable to provide adequate clearance. Similarly, the angle α of the first pulley 410 is adapted and designed to prevent the cable 72 from rubbing against itself or experiencing interference with other components of the hoist apparatus 10 as it travels from the third pulley 560, around the first pulley 410 and back to the fourth pulley 570.

Furthermore, the relative height and spatial location of the point that cable 72 exits the cable receiving groove 422 of the second pulley 420 relative to the main-frame 32 is adapted and designed to generally coincide with the relative height and spatial location of the point that cable 72 enters the cable receiving groove 562 of the third pulley 560 relative to the main-frame 32. Similarly, the relative height and spatial location of the point that cable 72 exits the cable receiving groove 562 of the third pulley 560 relative to the main-frame 32 is adapted and designed to generally coincide with the relative height and spatial location of the point that cable 72 enters the cable receiving groove 412 of the first pulley 410 relative to the main-frame 32. In addition, the relative height and spatial location of the point that cable 72 exits the cable receiving groove 412 of the first pulley 410 relative to the main-frame 32 is adapted and designed to generally coincide with the relative height and spatial location of the point that cable 72 enters the cable receiving groove 572 of the fourth pulley 570 relative to the main-frame 32. In this manner, the efficiency of the cable winch system 70 is increased and the interference and obstructions experienced by the cable 72 as it travels along the path through the cable winch system 70 are decreased. Also, in this manner, the number of cable stays or other supports necessary to align or otherwise situate the cable in a desired location to avoid an obstruction or interference are minimized or eliminated. It should be understood that the path of the cable may differ in additional embodiments of the hoist apparatus. It should also be understood that less than four pulleys or sheaves or more than four pulleys or sheaves may be provided in additional embodiments of the hoist apparatus and the pulleys of various embodiments may be configured in a variety of different ways.

Referring again to FIGS. 2A-2D, the movement of the moveable sheave carrier 140 within the sheave carrier channel 160 is powered by the winch cylinder 150. The winch cylinder 150 is mounted to the main-frame 32 and the piston rod 600 of the winch cylinder is attached to the winch cylinder attachment element 550 extending from the moveable sheave carrier 140 (as shown schematically in FIG. 6A).

During a loading procedure, upon actuation of the winch cylinder 150, the moveable sheave carrier 140 is urged through the sheave carrier channel 160 toward the rear end 52 of the main-frame 32 by the extension of piston rod 600 of winch cylinder 150. As the moveable sheave carrier 140 is urged towards the rear end 52 of the main-frame, the distance between the moveable sheave carrier 140 and the stationary sheave block 130 is increased. This increase in the distance between the moveable sheave carrier 140 and the stationary sheave block 130 results in tension being placed upon the cable 72 and the container attachment element 170 of the cable 72 being drawn toward the stationary sheave block 130 located at the front end 50 of the main-frame 32 of the hoist apparatus 10.

The illustrated exemplary embodiment of the moveable sheave carrier 140 has a length of approximately 21 inches. In additional embodiments, the moveable sheave carrier 140 may have a length in the range of between approximately 8 inches to approximately 36 inches, or more. In yet further additional embodiments, the moveable sheave carrier may have a variety of additional length dimensions. The exemplary embodiment of moveable sheave carrier 140 has a length that is greater than that generally provided with conventional hoist apparatus. The extended length of the moveable sheave carrier 140 provides a variety of benefits. For example, the elongated length of the moveable sheave carrier 140 assists in preventing the twisting, tilting, rattling or other undesired movements of the moveable sheave carrier 140 relative to the sheave carrier channel 140 as it travels along the sheave carrier channel 160.

Figure 7B:
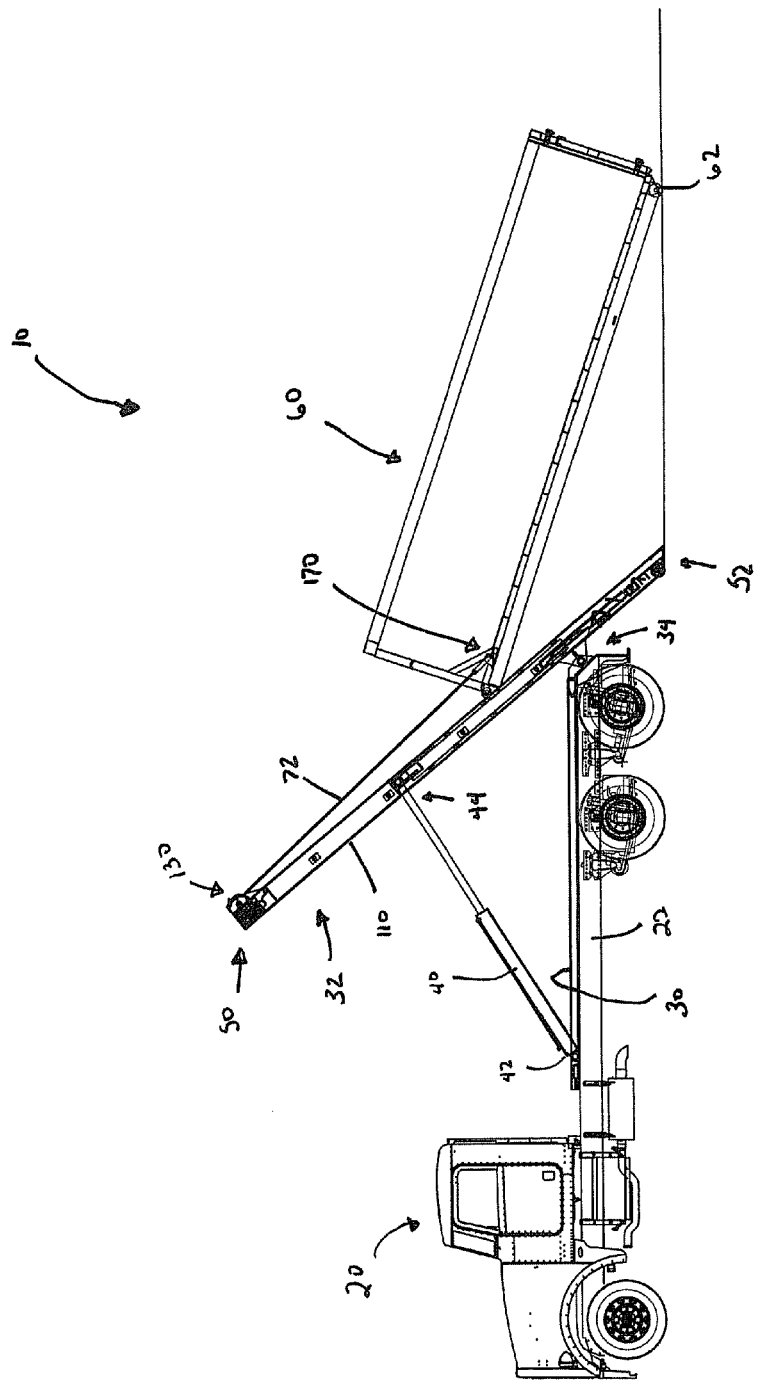
Figure 7C:
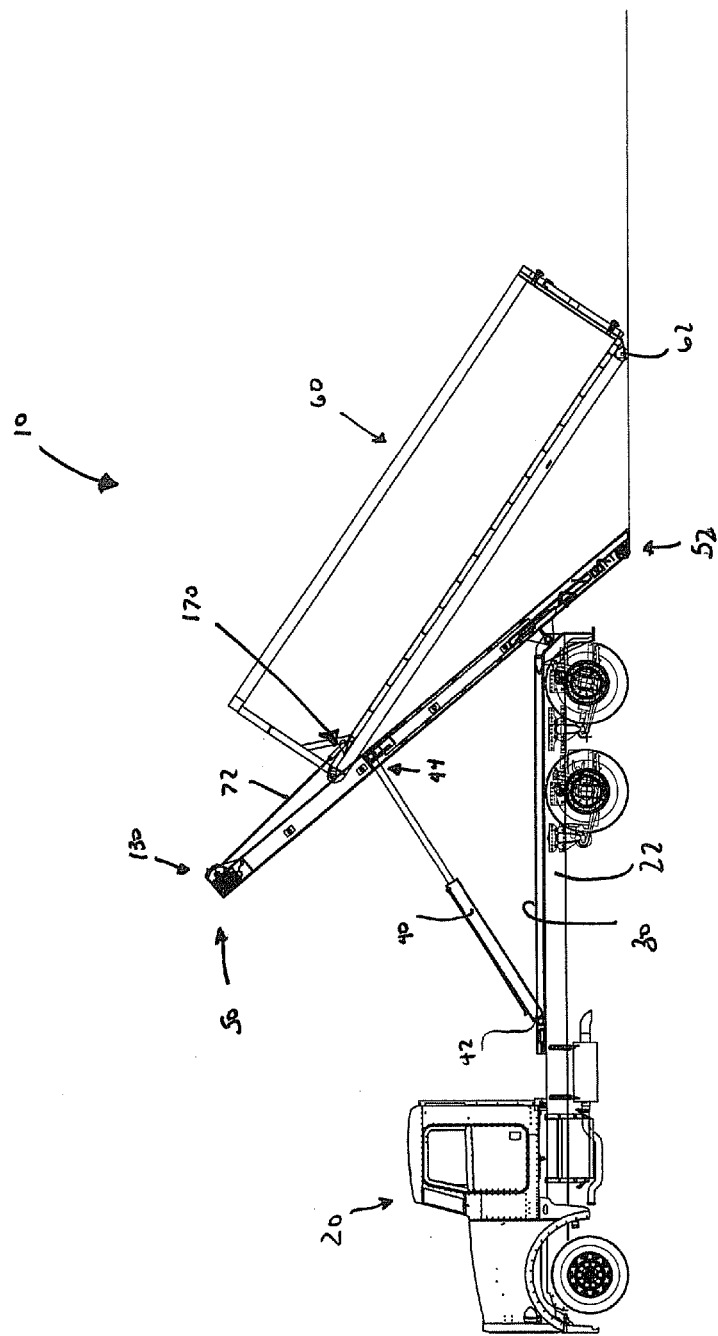

Referring now to FIGS. 7A-7D, when the attachment element 170 of the cable 72 of the cable winch system 70 is attached to a container and the main-frame 32 is located in the raised position with the rear end 52 of the main-frame located on or in proximity to the ground or other support surface supporting container 60, the drawing up of the attachment element 170 of the cable 72 draws the container 60 onto frame rails 110 of the main-frame 32. The winch cylinder 150 continues to urge the moveable sheave carrier 140 towards the rear end 54 of the main-frame 32 as the container 60 continues to be rolled or slid up onto the frame rails 110 of the main-frame 32 of the hoist apparatus 10. Once the container 60 is fully loaded onto the main-frame 32, as shown in FIG. 7D, the winch cylinder 150 is deactivated. After the container 60 has been loaded onto the main-frame 32, the main-frame may be lowered by lift cylinders 40 to the lowered, transporting position, as shown in FIG. 7E, thus completing the loading of the container 60 onto vehicle 20.

To unload the container 60 from the main-frame, the above-described operation is generally performed in reverse. The main-frame 32 is first raised to the raised position. With the main-frame 32 in the raised position, a door or other opening in the container 60 may be used to facilitate the dumping of the contents of the container 60, if desired. To unload the container 60 from the hoist apparatus 10, the winch cylinder 150 is activated to retract the moveable sheave carrier 140 back towards the stationary sheave block 130. This movement of the sheave block 130 back towards the front end 50 of the main-frame allow the portion of the cable 72 attached to the container 60 to be let out and the container 60 is slid down the frame rails 110 of the main-frame 32 back toward the ground. Once the container 60 has been unloaded from the hoist apparatus 10, the cable 72 can be detached from the container 60, the main-frame may be lowered and the vehicle 20 may be driven away from the container.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasable or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A hoist apparatus, comprising:
a frame including a pair of substantially parallel rails, the frame having a front end and a rear end;
a stationary sheave block mounted to the frame near the front end of the frame, the stationary sheave block including at least a first pulley and a second pulley mounted thereto, wherein each of the first and second pulleys include an axis and wherein the axis of the first pulley and the axis of the second pulley are coplanar and reside in a plane that extends through and is generally perpendicular to the substantially parallel rails of the frame, wherein the first pulley is mounted to the stationary sheave block at an angle of between approximately 0° to approximately 25° relative to a plane extending between and generally perpendicular to the pair of rails;
a moveable sheave carrier mounted to the frame and adapted for movement along the length of the frame, wherein the moveable sheave carrier includes at least a third pulley and a fourth pulley;
at least one powered winch mechanism attached to the moveable sheave carrier for moving the moveable sheave carrier along the length of the frame upon activation of the powered winch mechanism; and
a cable including a first end detachably fixed to an article to be loaded onto a vehicle and a second end fixed to the hoist apparatus, the cable being adapted for travelling through the first pulley and the second pulley of the stationary sheave block and the third pulley and the fourth pulley of the moveable sheave carrier in a predetermined path;
wherein each of the first pulley, the second pulley, the third pulley and the fourth pulley have a cable receiving ridge defined in an outer periphery thereof;
wherein the cable is adapted to travel through the cable receiving ridge of each of the first pulley, the second pulley, the third pulley and the fourth pulley in the predetermined path;
wherein the height of the cable exiting the cable receiving ridge of the second pulley relative to the frame when the frame is in a horizontal lowered position is adapted to substantially coincide with the height of the cable entering the cable receiving ridge of the third pulley relative to the frame when the frame is in a horizontal lowered position;
wherein the height of the cable exiting the cable receiving ridge of the third pulley relative to the frame when the frame is in a horizontal lowered position is adapted to substantially coincide with the height of the cable entering the cable receiving ridge of the first pulley relative to the frame when the frame is in a horizontal lowered position; and
wherein the height of the cable exiting the cable receiving ridge of the first pulley relative to the frame when the frame is in a horizontal lowered position is adapted to substantially coincide with the height of the cable entering the cable receiving ridge of the fourth pulley relative to the frame when the frame is in a horizontal lowered position; and
wherein the third pulley is mounted to the moveable sheave carrier at a first location and the fourth pulley is mounted to the moveable sheave carrier at a second location, wherein the second location is either closer to the front end of the frame than the first location or farther from the front end of the frame than the first location.

2. A hoist apparatus, comprising:
a frame including a pair of substantially parallel rails, the frame having a front end and a rear end;
a stationary sheave block mounted to the frame near the front end of the frame, the stationary sheave block including at least a first pulley and a second pulley mounted thereto, wherein each of the first and second pulleys include an axis and wherein the axis of the first pulley and the axis of the second pulley are coplanar and reside in a plane that extends through and is generally perpendicular to the substantially parallel rails of the frame, wherein the second pulley is mounted to the stationary sheave block at an angle of between approximately 50° to approximately 75° relative to a plane extending between and generally perpendicular to the pair of rails;

a moveable sheave carrier mounted to the frame and adapted for movement along the length of the frame, wherein the moveable sheave carrier includes at least a third pulley and a fourth pulley;

at least one powered winch mechanism attached to the moveable sheave carrier for moving the moveable sheave carrier along the length of the frame upon activation of the powered winch mechanism; and a cable including a first end detachably fixed to an article to be loaded onto a vehicle and a second end fixed to the hoist apparatus, the cable being adapted for travelling through the first pulley and the second pulley of the stationary sheave block and the third pulley and the fourth pulley of the moveable sheave carrier in a predetermined path;

wherein each of the first pulley, the second pulley, the third pulley and the fourth pulley have a cable receiving ridge defined in an outer periphery thereof;

wherein the cable is adapted to travel through the cable receiving ridge of each of the first pulley, the second pulley, the third pulley and the fourth pulley in the predetermined path;

wherein the height of the cable exiting the cable receiving ridge of the second pulley relative to the frame when the frame is in a horizontal lowered position is adapted to substantially coincide with the height of the cable entering the cable receiving ridge of the third pulley relative to the frame when the frame is in a horizontal lowered position;

wherein the height of the cable exiting the cable receiving ridge of the third pulley relative to the frame when the frame is in a horizontal lowered position is adapted to substantially coincide with the height of the cable entering the cable receiving ridge of the first pulley relative to the frame when the frame is in a horizontal lowered position; and wherein the height of the cable exiting the cable receiving ridge of the first pulley relative to the frame when the frame is in a horizontal lowered position is adapted to substantially coincide with the height of the cable entering the cable receiving ridge of the fourth pulley relative to the frame when the frame is in a horizontal lowered position; and wherein the third pulley is mounted to the moveable sheave carrier at a first location and the fourth pulley is mounted to the moveable sheave carrier at a second location, wherein the second location is either closer to the front end of the frame than the first location or farther from the front end of the frame than the first location.

3. The hoist apparatus of claim 1, further comprising at least two fluid actuated lift cylinders for moving the frame from a lowered position to a raised position, wherein the at least two fluid actuated cylinders are located inwardly of the pair of rails within the space defined between the pair of rails of the frame when the frame is in the lowered position.

4. The hoist apparatus of claim 2, further comprising at least two fluid actuated lift cylinders for moving the frame from a lowered position to a raised position, wherein the at least two fluid actuated cylinders are located inwardly of the pair of rails within the space defined between the pair of rails of the frame when the frame is in the lowered position.

5. A hoist apparatus, comprising:

a frame including a pair of substantially parallel rails, the frame having a front end and a rear end;

a stationary sheave block mounted to the frame, the stationary sheave block including at least a first pulley and a second pulley mounted thereto;

a moveable sheave carrier mounted to the frame and adapted for movement along the length of the frame, wherein the moveable sheave carrier includes at least a third pulley and a fourth pulley, wherein the third pulley is mounted to the moveable sheave carrier at a first location and the fourth pulley is mounted to the moveable sheave carrier at a second location, wherein the second location is either closer to the front end of the frame than the first location or farther from the front end of the frame than the first location;

at least one powered winch mechanism attached to the moveable sheave carrier for moving the moveable sheave carrier along the length of the frame upon activation of the powered winch mechanism; and a cable including a first end detachably fixed to an article to be loaded onto a vehicle and a second end fixed to the hoist apparatus, the cable being adapted for travelling through the first pulley and the second pulley of the stationary sheave block and the third pulley and the fourth pulley of the moveable sheave carrier in a predetermined path.

6. The hoist apparatus of claim 5, wherein each of the first and second pulleys include an axis and wherein the axis of the first pulley and the axis of the second pulley both reside in a plane that extends through and is generally perpendicular to the parallel rails of the frame.

7. The hoist apparatus of claim 5, wherein the moveable sheave carrier comprises a top wall, a bottom wall, a pair of sidewalls which define a generally enclosed space and a dividing wall which divides the enclosed space into a top compartment and a bottom compartment;

wherein the third pulley is mounted to the moveable sheave carrier within the top compartment; and wherein the fourth pulley is mounted within the bottom compartment.

8. The hoist apparatus of claim 7, wherein the third pulley comprises a shaft which is mounted between the top wall and the dividing wall; and wherein the fourth pulley comprises a shaft which is mounted between the dividing wall and the bottom wall.

9. The hoist apparatus of claim 8, wherein the third pulley and the fourth pulley are offset relative to one another so that no portion of third pulley resides above the fourth pulley when the moveable sheave carrier is in a generally horizontal position.

10. The hoist apparatus of claim 5, wherein each of the third pulley and the fourth pulley comprise a grease fitting; and wherein the third pulley and the fourth pulley are each separately mounted to the moveable sheave carrier to allow for separate greasing of the grease fittings of the third pulley and the fourth pulley by a greasing device.

11. The hoist apparatus of claim 7, wherein each of the third pulley and the fourth pulley comprise a grease fitting; and wherein each of the grease fittings are accessible to a greasing device from a position above the moveable sheave carrier when the moveable sheave carrier is in a generally horizontal position to allow for separate greasing of the grease fittings of the third pulley and the fourth pulley.

12. The hoist apparatus of claim 5, further comprising a channel mounted to the frame, and wherein the moveable sheave carrier is adapted for movement within the channel.

13. The hoist apparatus of claim 5, wherein the moveable sheave carrier has a length of between approximately 8 inches to approximately 36 inches.

14. The hoist apparatus of claim 5, wherein the moveable sheave carrier has a length of approximately 21 inches.

15. A vehicle comprising:
a hoist apparatus, for loading an article onto the vehicle:
a frame including a pair of substantially parallel rails, the frame having a front end and a rear end;
at least two fluid actuated lift cylinders for moving the frame from a lowered position to a raised position, wherein the at least two fluid actuated cylinders are located inwardly of the pair of rails within the space defined between the pair of rails of the frame when the frame is in the lowered position;
a stationary sheave block mounted to the frame, the stationary sheave block including at least a first pulley and a second pulley mounted thereto, wherein each of the first and second pulleys include an axis and wherein the axis of the first pulley and the axis of the second pulley both reside in a plane that extends through and is generally perpendicular to the substantially parallel rails of the frame, wherein the first pulley and the second pulley are aligned with one another and wherein neither of the first pulley or the second pulley are mounted nearer to the front end or nearer to the rear end of the frame than the other of the first pulley or second pulley;
a moveable sheave carrier mounted to the frame and adapted for movement along the length of the frame, wherein the moveable sheave carrier includes at least a third pulley and a fourth pulley, wherein the third pulley is mounted to the moveable sheave carrier at a first location and the fourth pulley is mounted to the moveable sheave carrier at a second location, wherein the second location is either closer to the front end of the frame than the first location or farther from the front end of the frame than the first location;
at least one powered winch mechanism attached to the moveable sheave carrier for moving the moveable sheave carrier along the length of the frame upon activation of the powered winch mechanism; and
a cable including a first end detachably fixed to an article to be loaded onto a vehicle and a second end fixed to the hoist apparatus, the cable being adapted for travelling through the first pulley and the second pulley of the stationary sheave block and the third pulley and the fourth pulley of the moveable sheave carrier in a predetermined path.

16. A hoist apparatus, comprising:
a frame, comprising:
first rail; and
a second rail, wherein a plane is defined between the first rail and the second rail;
a first sheave assembly fixed relative to the frame, wherein the first sheave assembly comprises:
a first pulley having a first receiving groove, wherein the first receiving groove comprises a first exit edge, and wherein the first exit edge is positioned at a first exit height relative to the plane; and
a second pulley having a second receiving groove, wherein the second receiving groove comprises a second entry edge and a second exit edge, wherein the second entry edge is positioned at a second entry height relative to the plane, and wherein the second exit edge is positioned at a second exit height relative to the plane;
a second sheave assembly movable relative to the frame, wherein the second sheave assembly comprises:
a third pulley having a third receiving groove, wherein the third receiving groove comprises a third entry edge and a third exit edge, wherein the third entry edge is positioned at a third entry height relative to the plane, and wherein the third exit edge is positioned at a third exit height relative to the plane; and
a fourth pulley having a fourth receiving groove, wherein the fourth receiving groove comprises a fourth entry edge, and wherein the fourth entry edge is positioned at a fourth entry height relative to the plane; and
a cable engaged with the first pulley, the second pulley, the third pulley, and the fourth pulley, wherein the cable extends between the first exit edge of the first receiving groove and the third entry edge of the third receiving groove, between the third exit edge of the third receiving groove and the second entry edge of the second receiving groove, and between the second exit edge of the second receiving groove and the fourth entry edge of the fourth receiving groove;
wherein the first exit height is substantially equal with the third entry height, wherein the third exit height is substantially equal with the second entry height, and wherein the second exit height is substantially equal with the fourth entry height.

17. A hoist apparatus, comprising:
a frame, comprising:
first rail; and
a second rail, wherein a plane is defined between the first rail and the second rail;
a first sheave assembly fixed relative to the frame, wherein the first sheave assembly comprises:
a first pulley having a first receiving groove, wherein the first receiving groove comprises a first exit edge; and
a second pulley having a second receiving groove, wherein the second receiving groove comprises a second entry edge and a second exit edge;
a second sheave assembly movable relative to the first rail and the second rail, wherein the second sheave assembly comprises:
a third pulley having a third receiving groove, wherein the third receiving groove comprises a third entry edge and a third exit edge; and
a fourth pulley having a fourth receiving groove, wherein the fourth receiving groove comprises a fourth entry edge; and
a cable engaged with the first pulley, the second pulley, the third pulley, and the fourth pulley, wherein the cable extends between the first exit edge of the first receiving groove and the third entry edge of the third receiving groove, between the third exit edge of the third receiving groove and the second entry edge of the second receiving groove, and between the second exit edge of the second receiving groove and the fourth entry edge of the fourth receiving groove;
wherein the cable is generally parallel to the plane between the first exit edge and the third entry edge, between the third exit edge and the second entry edge, and between the second exit edge and the fourth entry edge.

* * * * *